US007594040B2

(12) United States Patent
Oshima et al.

(10) Patent No.: US 7,594,040 B2
(45) Date of Patent: Sep. 22, 2009

(54) NETWORK RELAY DEVICE HAVING NETWORK PLUG-AND-PLAY COMPLIANT PROTOCOLS FOR NETWORK RELAY

(75) Inventors: Yasuhiro Oshima, Nagano-ken (JP); Yoji Takada, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 216 days.

(21) Appl. No.: 11/607,648

(22) Filed: Dec. 1, 2006

(65) Prior Publication Data

US 2007/0263621 A1 Nov. 15, 2007

(30) Foreign Application Priority Data

Dec. 2, 2005 (JP) ............................ 2005-349155
Dec. 7, 2005 (JP) ............................ 2005-353288

(51) Int. Cl.
*H04L 12/28* (2006.01)
*H04L 12/56* (2006.01)
*G06F 3/00* (2006.01)

(52) U.S. Cl. ............................... 710/8; 710/1; 370/351; 370/389

(58) Field of Classification Search ..................... 710/1, 710/8; 370/351, 389
See application file for complete search history.

(56) References Cited

U.S. PATENT DOCUMENTS

2002/0083143 A1* 6/2002 Cheng ........................ 709/208

(Continued)

FOREIGN PATENT DOCUMENTS

FR 2 837 045 9/2003

(Continued)

OTHER PUBLICATIONS

European Search Report dated Apr. 18, 2007, issued in European Application No. 06256069.3.

(Continued)

*Primary Examiner*—Alford W Kindred
*Assistant Examiner*—Richard Franklin
(74) *Attorney, Agent, or Firm*—Nutter McClennen & Fish LLP; John J. Penny, V

(57) ABSTRACT

A network relay device compliant with network plug-and-play protocols is presented. The relay device relays messages between a network and a device unit having N service devices that provide a service in response to a request from a client on the network. In one embodiment the relay device has a description creating module configured to create a device description which describes service devices included in the device unit connected to the relay device. If one or more service devices of the device unit are inoperative, the description creating module creates a device description that does not include a description portion of the inoperative service devices and forwards the created device description to the client. In another embodiment, the relay device has a response module configured to respond to a device search request sent from a client. The response module responds to a device search request sent from a client if at least one service device in the device unit is in operative condition, while the response module does not respond to a device search request if all of the service devices in the device unit are in inoperative condition.

4 Claims, 18 Drawing Sheets

U.S. PATENT DOCUMENTS

| | | | | |
|---|---|---|---|---|
| 2004/0136027 | A1 | 7/2004 | Zehler | |
| 2006/0117084 | A1 * | 6/2006 | Morozumi et al. | 709/203 |
| 2006/0150236 | A1 * | 7/2006 | Sakuda et al. | 725/135 |

FOREIGN PATENT DOCUMENTS

| | | | |
|---|---|---|---|
| JP | 2000-293471 | | 10/2000 |
| JP | 2001-290724 | | 10/2001 |
| WO | WO-02/49276 | A2 | 6/2002 |

OTHER PUBLICATIONS

"Universal Plug and Play Device Architecture," Version 1.0, Jun. 8, 2000 © 1999-2000 Microsoft Corporation.

* cited by examiner

USB interface/endpoint configuration

Logical channel configuration

D4 packet configuration (for USB transfer)

Typical sequence example

Fig.9

Device description of MFP (during normal operation)

```
<?xml version="1.0" ?>
<root xmlns="urn:schemas-upnp-org:device-1-0">
 <specVersion>
  <major>1</major>
  <minor>0</minor>
 </specVersion>
 <URLBase>http://169.254.100.100:80</URLBase>
 <device>                                                          } Basic device
  <deviceType>urn:schemas-upnp-org:device:Basic:1</deviceType>
    ...
  <deviceList>
   <device>                                                        } Printer device
    <deviceType>urn:schemas-upnp-org:device:Printer:1</deviceType>
      ...
    <presentationURL>/PRESENTATION/PRINTER</presentationURL>
    <serviceList>
     <service>
      <serviceType>urn:schemas-upnp-org:service:PrintBasic:1</serviceType>
      <serviceId>urn:upnp-org:serviceId:1</serviceId>
      <SCPDURL>/SCPD/PRINTBASIC1.XML</SCPDURL>
      <controlURL>/CONTROL/PRINTBASIC1</controlURL>
      <eventSubURL>/EVENT/PRINTBASIC1</eventSubURL>
     </service>
     <service>
      <serviceType>urn:schemas-upnp-org:service:PrintEnhanced:1</serviceType>
      <serviceId>urn:upnp-org:serviceId:3</serviceId>
      <SCPDURL>/SCPD/PRINTENHANCED1.XML</SCPDURL>
      <controlURL>/CONTROL/PRINTENHANCED1</controlURL>
      <eventSubURL>/EVENT/PRINTENHANCED1</eventSubURL>
     </service>
    </serviceList>
   </device>
   <device>                                                        } Scanner device
    <deviceType>urn:schemas-upnp-org:device:Scanner:1</deviceType>
      ...
   </device>
   <device>                                                        } Storage device
    <deviceType>urn:schemas-upnp-org:device:Storage:1</deviceType>
      ...
   </device>
  </deviceList>
 </device>
</root>
```

Fig.11

Device description when MFP power is off

```
<?xml version="1.0" ?>
<root xmlns="urn:schemas-upnp-org:device-1-0">
 <specVersion>
  <major>1</major>
  <minor>0</minor>
 </specVersion>
 <URLBase>http://169.254.100.100:80</URLBase>
 <device>
  <deviceType>urn:schemas-upnp-org:device:Basic:1</deviceType>
  <presentationURL>/PRESENTATION/BASIC</presentationURL>
   ...
 </device>
</root>
```

Basic device

TV screen when MFP power is off

Basic device presentation screen

Process sequence when MFP has a problem during relay unit startup (Embodiment 2)

Process sequence when MFP encounters a problem during operation (Embodiment 3)

NETWORK RELAY DEVICE HAVING NETWORK PLUG-AND-PLAY COMPLIANT PROTOCOLS FOR NETWORK RELAY

CROSS-REFERENCE TO RELATED APPLICATIONS

The present application claims the priority based on Japanese Patent Application No. 2005-349155 filed on Dec. 2, 2005, and Japanese Patent Application No. 2005-353288 filed on Dec. 7, 2005, the disclosures of which are hereby incorporated by reference in their entirety.

BACKGROUND OF THE INVENTION

1. Field of the Invention

The present invention relates to control technology for a network plug-and-play compliant network relay device.

2. Description of the Related Art

Plug-and-play is a well-known technology that enables peripheral devices to be connected to a computer or disconnected from a computer at arbitrary timing after computer startup. In recent years, extension of plug-and-play technology to networks has led the development of Universal Plug and Play (hereinafter UPnP; UPnP is a trademark of UPnP Implementers Corporation). The use of UPnP enables network devices to be connected to a network or disconnected from the network at arbitrary timing. Herein, the architecture for realizing such plug-and-play capability in a network shall be termed "network plug-and-play."

UPnP compliant network devices are able to function as service devices of various kinds. Here, "service device" refers to a device for executing a particular service in response to an external request. Service devices can be realized as devices of various kinds (termed "device units"), such as a printer, scanner, fax, copier, memory device, camera, clock or the like. It is also possible for the functions of several service devices to be realized by a single device unit.

It would be desirable if, through the use of a UPNP protocol compliant network relay device, non-UPnP compliant device units could be utilized as UPnP protocol compliant devices as well. However, to date, there has not yet been conducted sufficient research to how such a relay device would be achieved. For example, there has yet to be devised satisfactory means for notifying other clients in the event that a service device is not operating normally. As a result, even when a service device is not operating normally, clients will continue to attempt to utilize the device, and this represents wasted communication which reduces the communication efficiency of the network as a whole.

SUMMARY OF THE INVENTION

It is therefore an object of the present invention to provide technology for mitigating the communication efficiency reduction in a network plug-and-play compliant network, in the event that a service device is not operating normally.

In an aspect of the present invention, there is provided a network relay device compliant with network plug-and-play protocols for relay between a network and a device unit having N service devices that provide a service in response to a request from a client on the network where N is an integer equal to 1 or greater. In one embodiment, the network relay device comprises a description creating module configured to create a device description which describes service devices included in the device unit connected to the network relay device. If one or more service devices among the N service devices belonging to the device unit are inoperative when the description creating module receives a request for a device description sent from a client, the description creating module creates a device description that does not include a description portion of the inoperative service devices and forwards the created device description to the client. In another embodiment, the network relay device comprises a response module configured to respond to a device search request sent from a client in a accordance with the network plug-and-play protocols. The response module responds to a device search request sent from a client if at least one service device in the device unit is in operative condition, while the response module does not respond to a device search request sent from a client if all of the service devices in the device unit are in inoperative condition.

It is possible for the invention to be reduced to practice in various forms, for example, a network device; a network protocol control device; a control method and a control device for such devices; a computer program for realizing the functions of such a method or device; a recording medium having such a computer program recorded thereon; a data signal containing such a computer program and embodied in a carrier wave; and so on.

These and other objects, features, aspects, and advantages of the present invention will become more apparent from the following detailed description of the preferred embodiments with the accompanying drawings.

BRIEF DESCRIPTION OF THE DRAWINGS

FIG. 9 illustrates an example of the device description of the multifunction peripheral device;

FIG. 11 illustrates an example of a device description created in Embodiment 1;

DESCRIPTION OF THE PREFERRED EMBODIMENT

The embodiments of the invention shall be described in terms of certain preferred examples, in the order indicated below.

A. Description of Terms
B. System Overview
C. Device Configuration and Device Description of Multifunction Peripheral Device
D. Embodiment 1
E. Embodiment 2
F. Embodiment 3
G. Embodiment 4
H. Variation Examples A. Description of Terms The meanings of certain terms used in the following description are as follows.

DHCP (Dynamic Host Configuration Protocol): a protocol for dynamically assigning IP addresses.

GENA (General Event Notification Architecture): In UPnP architecture, used when an event is issued.

HTTP (HyperText Transfer Protocol): the hypertext transfer protocol.

HTTPMU (HTTP Multicast over UDP): HTTP multicasting using UDP (User Datagram Protocol).

HTTPU (HTTP (unicast) over UDP): HTTP unicasting using UDP.

MFP (Multi Function Peripheral): A multi function peripheral device having the functions of several devices.

SOAP (Simple Object Access Protocol): In UPnP architecture, used for action request and response by RPC (Remote Procedure Call).

SSDP (Simple Service Discovery Protocol): In UPnP architecture, used for service discovery (detection).

UPnP (Universal Plug and Play): trademark of UPnP Implementers Corporation.

URI (Uniform Resource Identifier): a broader concept of URL (Uniform Resource Locator); an identifier indicating the unique location of a resource.

XHTML (eXtensible HyperText Markup Language): A type of text markup language compatible with HTML, representing one implementation of XML. XHTML-print, discussed later, is a standard for printing XHTML documents.

XML (eXtensible Markup Language): extensible Markup Language

The numerous protocols mentioned above are used in UPnP, and will herein be referred to collectively as "UPNP protocols."

B. System Overview

Figure 1:
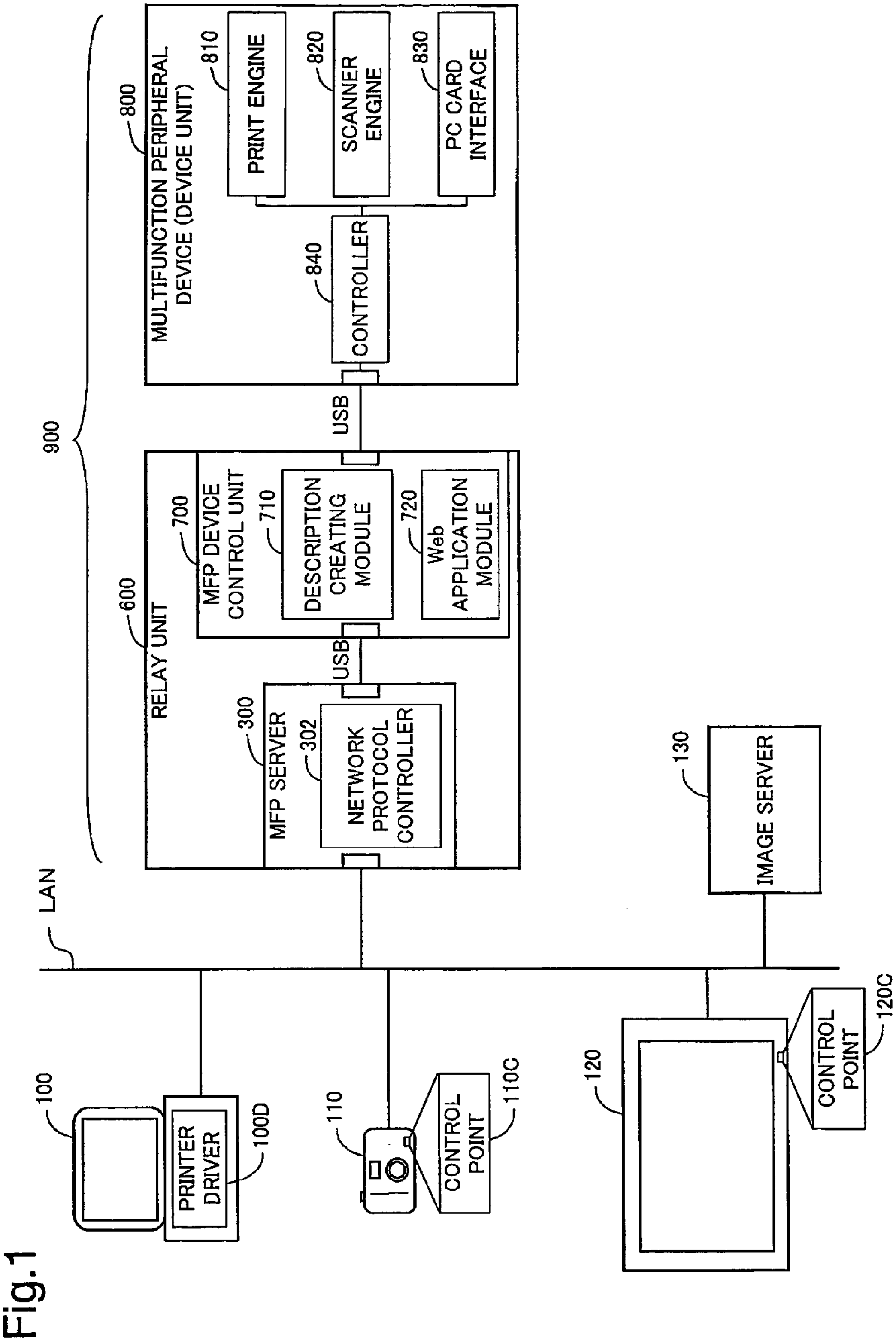
FIG. 1 is a conceptual diagram depicting the configuration of a network system implementing an embodiment of the invention.

FIG. 1 is a conceptual diagram depicting the configuration of a network system implementing an embodiment of the invention. This network system comprises a personal computer 100, a digital camera 110, a digital TV set 120, an image server 130, and a relay unit 600, interconnected via a LAN. The relay unit 600 is connected to a multifunction peripheral device 800. The multifunction peripheral device 800 per se is noncompliant with the UPnP protocols, but the relay unit 600 executes processes in accordance with the UPnP protocols. Accordingly, the device 900 composed of the relay unit 600 and the multifunction peripheral device 800 can function as a UPnP compliant network device. The LAN may be a wired network such as IEEE 802.3, or a wireless network such as IEEE 802.11b/g/a. The digital camera 110 and the digital TV set 120 are UPnP compliant network devices. The digital camera 110 and the digital TV set 120 comprise control points 110C, 120C in UPnP architecture. UPnP architecture and control points will be discussed later. While the personal computer 100 and the image server 130 are one element in this network system, they are not UPnP compliant.

The personal computer 100 has the function of creating print data for images using a printer driver 100D, and of transferring via the LAN this print data via the relay unit 600 to the multifunction peripheral device 800, which prints it. During this printing process, the multifunction peripheral device 800 functions as an ordinary network printer. On the other hand, in the event that printing is carried out in accordance with a request from a control point (e.g. 110C), the device 900 composed of the multifunction peripheral device 800 and the relay unit 600 will function as a UPnP compliant printer device.

The relay unit 600 has an MFP server 300 and a MFP device control unit 700. The MFP server 300 functions as a network protocol controller 302 for mediating messages exchanged between the MFP device control unit 700 and other devices on the LAN. As will be discussed later, in a typical case, during message transfer the MFP server 300 interprets the UPnP protocols in relation to the message header, but neither interprets nor processes the message body.

The MFP device control unit 700 has a description creating module 710 and a Web application module 720. The description creating module 710 has the function of creating device descriptions and service descriptions according to the UPnP protocols, and providing these descriptions in response to requests from clients (control points). The Web application module 720 has the function of creating a Web page for use in setting and utilizing the network device 900, and for providing the Web page in response to requests from clients (control points). These modules 710, 720 are installed in the form of computer programs, but could instead be realized through hardware circuits.

The MFP server 300 and the MFP device control unit 700 are connected by a USB (Universal Serial Bus); the MFP device control unit 700 and the multifunction peripheral device 800 are also connected by USB. However, it is possible to utilize some other physical interface besides USB. It is also possible for the MFP server 300 and the MFP device control unit 700 to be connected with a communications protocol different from the UPnP protocols.

The multifunction peripheral device 800 includes service devices 810, 820, 830 for providing services to clients, and a controller 840. Here, the installed service devices are a print engine 810, a scanner engine 820, and a PC card interface 830. It is sufficient for the multifunction peripheral device 800 to have at least one service device; typically, it is composed of N (where N is an integer equal to 1 or greater) service devices. The multifunction peripheral device 800 is also referred to as a "device unit."

The print engine 810 is a printing mechanism for executing printing according to given print data. In this embodiment, where the control points 110C, 120C send XHTML data to the multifunction peripheral device 800 according to UPNP protocols to carry out printing, the MFP device control unit 700 interprets the XHTML data, executes color conversion and halftone processing to create print data, and then sends this print data to the print engine 810. However, it would be possible to have an arrangement whereby the controller 840 or the print engine 810, rather than the MFP device control unit 700, has the color conversion and halftone processing functions. On the other hand, where printing is requested from the personal computer 100, the page description language produced by the printer driver 100D is interpreted by the MFP device control unit 700 to create print data, which is sent to the print engine 810. "Print data" herein refers to data representing a printout by means of dot data indicating dot on/off state on a printing medium. Print data is composed of control commands unique to the printer. XHTML is not applicable to print data, since it is a document markup language for describing documents. The scanner engine 820 is a mechanism for scanning an image and creating image data.

UPnP is an architecture whereby it is possible to connect a network device to a network or disconnect it from the network, at arbitrary timing. The UPnP network is composed of control points 110C, 120C and service devices 810, 820, 830. Here, "service device" refers to a device which provides a service. Unless indicated otherwise herein, "device" and "service device" are used as synonyms. A "control point" means a controller that detects or controls another device or devices on the network, and that functions as a client for a service device. The various functions of UPnP compliant network devices will be discussed later.

Figure 2:
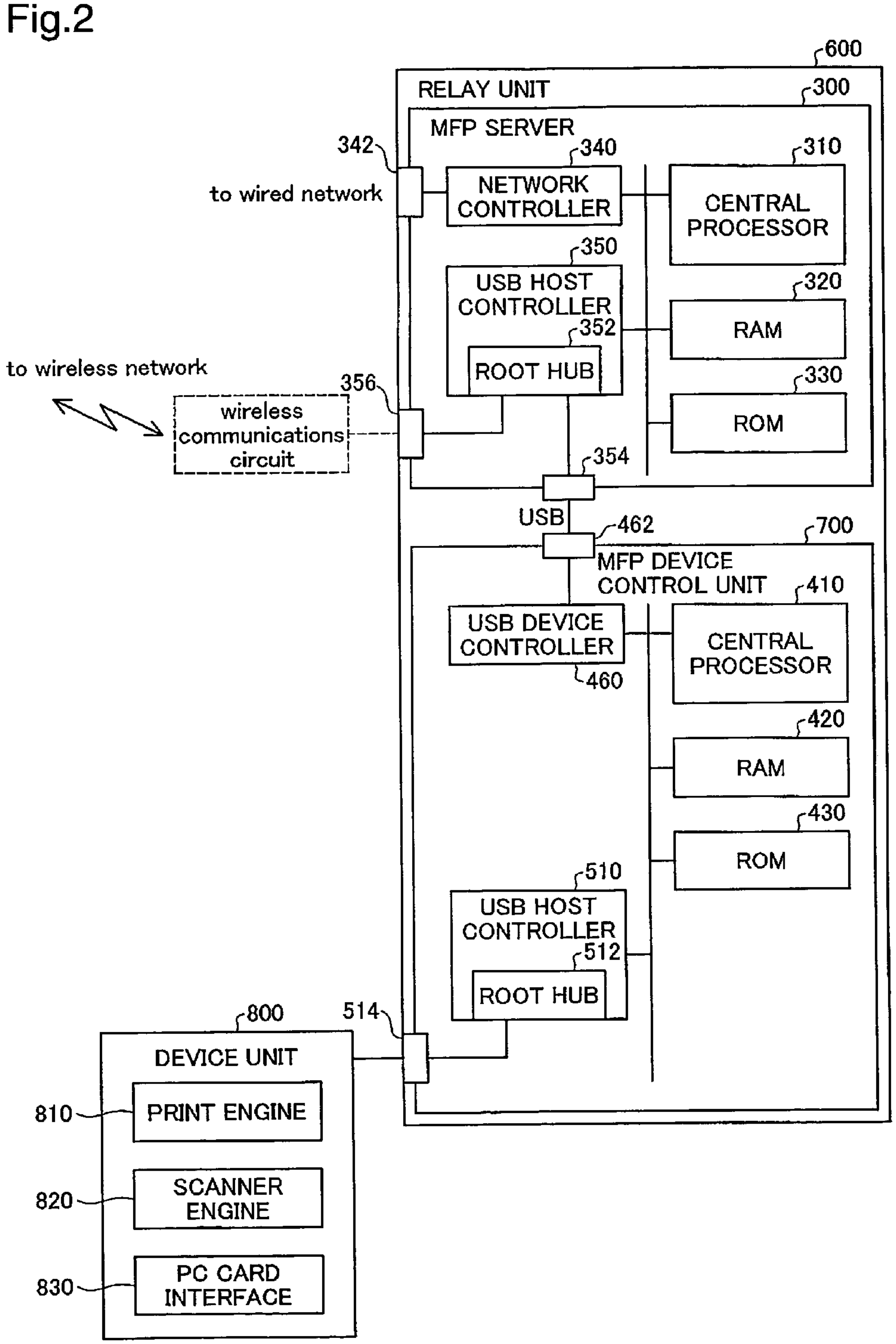
FIG. 2 is a block diagram depicting the internal arrangement of the MFP server and the MFP device control unit in the relay unit.

FIG. 2 is a block diagram depicting the internal arrangement of the MFP server 300 and the MFP device control unit 700 within the relay unit 600. The MFP server 300 has a central controller (CPU) 310, RAM 320, ROM 330, a network controller 340, and a USB host controller 350. The network controller 340 is connected to a wired network via a connector 342. The USB host controller 350 has a root hub 352, with two USB connectors 354, 356 provided to the root hub 352. The first USB connector 354 connects via a USB cable to the USB connector 462 of the MFP device control unit 700. An additional device (e.g. a wireless communication circuit for communicating with a wireless LAN network) can be connected to the second USB connector 356.

The MFP device control unit 700 has a central controller (CPU) 410, RAM 420, ROM 430, a USB device controller 460, and a USB host controller 510. The first USB device controller 460 is connected via the USB connector 462 to the USB host controller 350 of the MFP server 300. The USB host controller 510 has a root hub 512, with a USB connector 514 provided to the root hub 512. The multifunction peripheral device 800 (device unit) is connected to this connector 514.

The central controller 310, the network controller 340, and the USB host controller 350 of the MFP server 300 function as the network protocol controller 302 in FIG. 1. More specifically, the network controller 340 carries out sending and receiving of messages according to the various network protocols. The central controller 310 interprets the UPnP protocols and determines the transfer destination. The USB host controller 350 transfers messages to and from the MFP device control unit 700. These controllers 310, 340, 350 transfer messages without interpreting or processing the message body.

The USB device controller 460 of the MFP device control unit 700 carries out sending and receiving of messages according to USB transfer protocol. The central controller 410 interprets the content of messages transferred via the MFP server 300, executes processing in response to the message content to create control data for the multifunction peripheral device 800, and sends the control data to the device 800. Operation of the service devices 810, 820, 830 in the multifunction peripheral device 800 is controlled in accordance with this control data. Rather than a separate MFP server 300 and MFP device control unit 700, the functions of both the MFP server 300 and the MFP device control unit 700 could be realized with a single unit.

The multifunction peripheral device 800 is equipped with a control panel and a display (monitor) for use by the user when making various settings, but these are not shown in the drawings.

Figure 3:
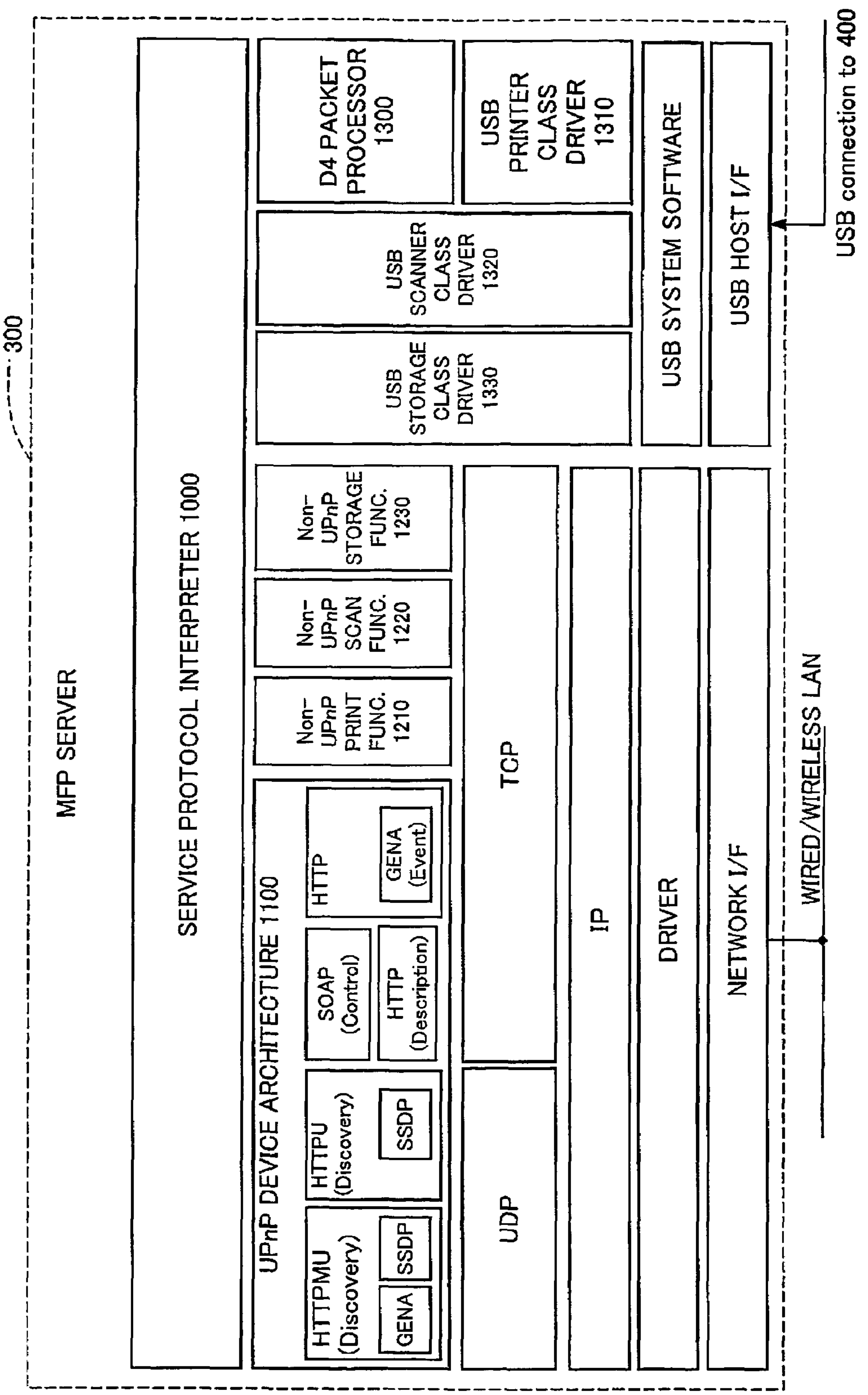
FIG. 3 is a block diagram depicting the hierarchical structure of the protocols of the MFP server.

FIG. 3 is a block diagram showing the hierarchical structure of the protocols of the MFP server 300. The MFP server 300 comprises a service protocol interpreter 1000 for interpreting the various network protocols. Under the service protocol interpreter 1000 there are provided network architecture layers and USB architecture layers. The network architecture layers include a UPnP device architecture 1100, and three non-UPnP device function modules 1210, 1220, and 1230. Below these are a UDP layer or TCP layer, an Internet protocol (IP) layer, a driver layer, and a network interface layer.

The USB architecture layers of the service protocol interpreter 1000 include a D4 packet processor 1300, a USB printer class driver 1310, a USB scanner class driver 1320, and a USB storage class driver 1330. Below these three device drivers 1310, 1320, 1330 are USB system software and a USB host interface (hardware). As will be understood from the drawing, the USB printer class driver 1310 performs data transfer using the "D4 packet" (the packet structure according to IEEE 1284.4), while the scanner class driver 1320 and the storage class driver 1330 do not use the D4 packet. The reason is that while the D4 packet is employed as the high-level protocol for the printer class, for the scanner class and storage class, on the other hand, a control stack (the architecture from the application layer to the physical layer) that does not use the D4 packet is standard in the OS.

UPnP architecture is composed according to various protocols such as HTTPMU, HTTPU, SOAP/HTTP, and HTTP. UPnP uses these protocols in accomplishing various processes such as the following.

(1) Addressing

When a UPnP device (hereinafter referred to simply as a "device") is connected to the network, a network address (IP address) is obtained by means of addressing. A DHCP server or Auto-IP is used for addressing. Where the network is equipped with a DHCP server, the device uses an IP address assigned by the DHCP server. Where there is no DHCP server, the device itself decides on an address, using an automatic IP addressing function called Auto-IP. In this embodiment, only a single IP address is assigned to the network device 900 including the relay unit 600 and the multifunction peripheral device 800, and the entire device 900 is recognized as being a single network device.

(2) Discovery (Detection)

Discovery is a process whereby a control point discovers where devices are located. Discovery can be accomplished by means of multicasting a discovery message by the control point, or by means of advertising the control point from a device that a device has joined the network. Discovery is carried out using HTTPMU/SSDP or HTTPU/SSDP. As a result of discovery, the control point and the device can proceed with processing on a peer-to-peer basis.

(3) Description

The specifics of the configuration of a device are described in XML by way of a device description. The specifics of the services provided by a device are described in XML by way of a service description. These descriptions are possessed by individual devices and are provided to a control point. The control point, by means of referring to these descriptions, can ascertain the specifics of a device and its services. An example of device description will be discussed later.

(4) Control

Control is a process whereby a control point transfers to a device a control message that includes an action request, and performs control of the device. Control is carried out using HTTP/SOAP.

(5) Eventing

When a prescribed event occurs, a service in the device notifies the control point that an event has occurred. Upon receiving notification that the event has occurred, the control point "subscribes" to that service. The event is transferred to the subscribing control point. Event notification is carried out using HTTP/GENA.

(6) Presentation

Presentation is a process wherein a control point acquires a presentation page described in HTML, from a presentation URL registered in the device description. By means of presentation, the control point can display the state of various devices, for example.

The present invention is applicable to future versions of UPnP as well. The present invention is also applicable to network plug-and-play standards other than UPnP, provided that the network plug-and-play standard enables peer-to-peer communication between any control point and device by means of addressing (automatic IP address determination) and device discovery, and that the architecture is one in which control points and devices exchange messages.

Figure 4:
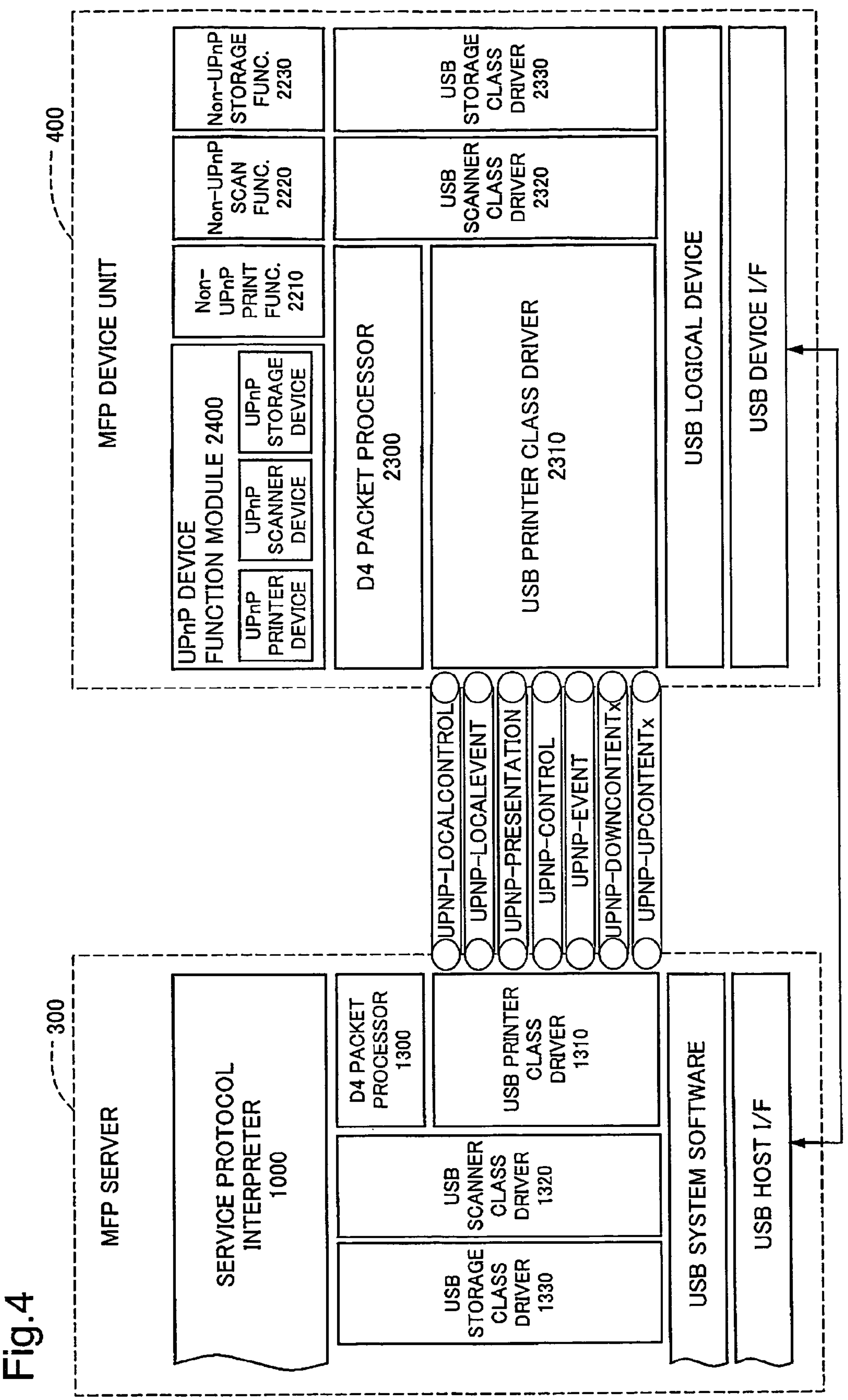
FIG. 4 is a block diagram depicting the hierarchical structure of the protocols of the MFP device control unit.

FIG. 4 is a block diagram showing the hierarchical structure of the protocols of the MFP device control unit 700. The MFP device control unit 700 has a UPnP device function module 2400, and three non-UPnP device function modules 2210, 2220, 2230. The UPnP device function module 2400 includes three UPnP device modules (corresponding to the three service devices 810, 820, 830 of FIG. 1). The device modules include service modules for executing services, but these are not depicted in the drawing. Below the UPnP device function module 2400 and the non-UPnP device function module 2210 are a D4 packet processor 2300 and a USB printer class driver 2310. Below the non-UPnP scanner function module 2220 and the non-UPnP storage function module 2230 are a USB scanner class driver 2320 and a USB storage class driver 2330. Below the three device drivers 2310, 2320, 2330 are a USB logical device and a USB device interface (hardware). As will be apparent from this hierarchical structure as well, when the UPnP scanner device or UPnP storage device performs a service for a control point, data transfer between the MFP server 300 and the MFP device control unit 700 takes place utilizing the USB printer class driver 2310. Accordingly, D4 packets can be utilized during data transfer for the UPnP scanner device or UPnP storage device as well.

As shown in FIG. 4, seven bidirectional communication channels are provided between the USB printer class driver 1310 of the MFP server 300 and the USB printer class driver 2310 of the MFP device control unit 700. These are logical channels that use D4 packets, intended to be used when the multifunction peripheral device 800 functions as a UPnP device. Likewise, between the service protocol interpreter 1000 and the UPnP device function module 2400 there are seven UPnP logical channels corresponding to the seven logical channels between the printer class drivers 1310, 2310; however, these are omitted from the drawing in FIG. 4. The following description turns first to the logical channels using D4 packets.

Figures 5A, 5B:
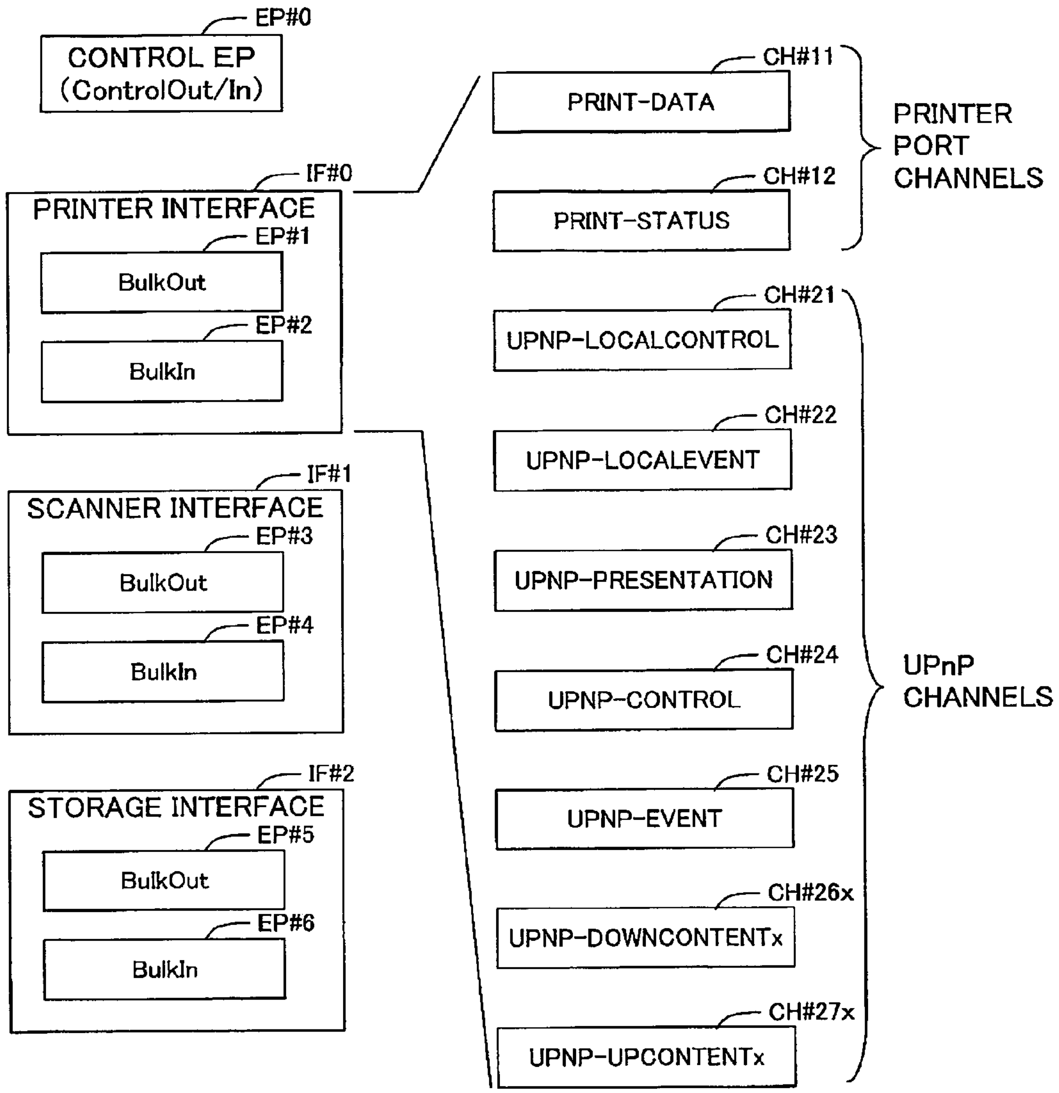
FIGS. 5A and 5B illustrate interface/endpoint configuration and logical channel configuration in the USB connection between the MFP server and the MFP device control unit.

FIGS. 5A and 5B illustrate a USB interface/endpoint configuration and a logical channel configuration concerning USB connection between the MFP server 300 and the MFP device control unit 700. Typically, a USB device will have an interface and endpoints. A USB transfer takes place between an endpoint and a USB host. That is, an "endpoint" is a logical resource for communication with a host. In the example of FIG. 5A, seven endpoints EP#0-EP#6 are shown. The Control endpoint EP#0 is an endpoint for sending and receiving standard device requests. A "standard device request" is a basic request needing to be supported by all USB devices. Accordingly, the Control endpoint EP#0 must always be provided for a USB device.

The BulkOut endpoint EP#1 and BulkIn endpoint EP#2 for the printer are endpoints for sending and receiving of messages for use by the print engine 810. Similarly, the BulkOut endpoint EP#3 and BulkIn endpoint EP#4 for the scanner are endpoints for sending and receiving of messages for use by the scanner engine 820. The endpoint EP#5 and endpoint EP#6 for the storage are endpoints for sending and receiving of messages for use by a memory card (PC card interface 830). Typically, in a USB device, endpoints other than the Control endpoint EP#0 are implemented by logical interfaces. In the example of FIG. 5A, a printer interface IF#0, a scanner interface #1, and a storage interface #2 are provided as logical interfaces.

In this embodiment, as depicted in FIG. 5B, the printer interface IF#0 is provided with nine logical channels. The functions of these channels are as follows.

(1) PRINT-DATA channel CH#11: a channel for sending and receiving print data transferred from the printer driver 100D (FIG. 1) using the Print port (a an LPR port number, or port #9100), from a personal computer 100 on the network. This channel is not shown in FIG. 4.

(2) PRINT-STATUS channel CH#12: a channel for the MFP server 300 to send and receive information indicating the status of the print engine 810; provided from the MFP server 300 to a personal computer 100 on the network by means of a protocol such as SNMP. This channel is not shown in FIG. 4.

(3) UPNP-LOCALCONTROL channel CH#21: a UPnP channel for communication between the MFP server 300 and the MFP device control unit 700, where the MFP server 300 is the requester and the MFP device control unit 700 is the responder. Using this channel, the MFP server 300 can acquire information of various kinds from the MFP device control unit 700.

(4) UPNP-LOCALEVENT channel CH#22: a UPnP channel for communication between the MFP server 300 and the MFP device control unit 700, where the MFP device control unit 700 is the requestor and the MFP server 300 is the responder. Using this channel, the MFP server 300 can be notified, for example, of a change in settings of the multifunction peripheral device 800 made by the user. When the multifunction peripheral device 800 is powered off, the MFP server 300 is notified of a UPnP termination request.

(5) UPNP-PRESENTATION channel CH#23: a channel for sending and receiving UPnP presentation data (Web page data). It is also possible to separately provide a channel for sending presentation data from the MFP device control unit 700 to a control point in response to a request from the control point (down channel), and another channel for uploading new presentation data from a control point to the MFP device control unit 700 (up channel).

(6) UPNP-CONTROL channel CH#24: a channel for sending and receiving data relating to an action issued by a control point according to the UPnP protocols. The reason for appending the "LOCAL" prefix to the aforementioned "UPNP-LOCALCONTROL" channel CH#21 is that this channel CH#21 is not used to transfer content of an action from a control point. In other words, the UPNP-CONTROL channel CH#24 is used only for the purpose of sending and receiving data relating to an action issued by a control point.

(7) UPNP-EVENT channel CH#25: a channel for sending an event to a subscribing control point according to the UPnP protocols. The reason for appending the "LOCAL" prefix to the aforementioned UPNP-LOCALEVENT channel CH#22 is that this channel CH#22 is not used to send an event to a control point. In other words, the UPNP-EVENT channel CH#25 is used only for the purpose of sending an event that has occurred in the multifunction peripheral device 800 to a control point.

(8) UPNP-DOWNCONTENTx channel CH#26x: a channel used for sending and receiving during downloading of content data from a control point to the MFP device control unit 700 according to the UPnP protocols. Here, the suffix "x" denotes the x-th channel among a number Ndown UPNP-DOWNCONTENT channels where Ndown is an integer equal to 2 or greater. While the number Ndown of useable UPNP-DOWNCONTENTx channels may be any number equal to 1 or greater, in preferred practice the value will be 2 or greater. By setting Ndown a value of 2 or greater, multiple streams of control content data can be received in parallel.

(9) UPNP-UPCONTENTx channel CH#27x: a channel used for sending and receiving during uploading of content data from the MFP device control unit 700 to a control point according to the UPnP protocols. Here, the suffix "x" denotes the x-th channel among a number Nup UPNP-UPCONTENT channels where Nup is an integer equal to 2 or greater. The number Nup of UPNP-UPCONTENTx channels may be the same as, or different from, the number Ndown of UPNP-DOWNCONTENTx channels. The total number of UPnP logical channels of FIG. 5B can be understood to be (5+Ndown+Nup).

Each logical channel can perform bidirectional communication utilizing both the BulkOut endpoint EP#1 and the Bulkin endpoint EP#2. Logical channel identifying information is registered in the D4 packet header described later in detail.

As noted previously, the nine types of logical channels shown in FIG. 5B are utilized by the USB connection between the MFP server 300 and the MFP device control unit 700. The USB connection between the MFP server 300 and the multifunction peripheral device 800, on the other hand, will preferably be configured to utilize only two logical channels, namely, the PRINT-DATA channel CH#11 and the PRINT-STATUS channel CH#12. The reason is that the MFP device control unit 700 has the function of interpreting messages of various kinds received according to the UPnP protocols, converting them to control data for the multifunction peripheral device 800, and transferring the control data (mainly) via the PRINT-DATA channel CH#11. However, it would be possible to utilize the same nine types of logical channels as those shown in FIG. 5B for the USB connection between the MFP device control unit 700 and the multifunction peripheral device 800 as well. For the USB connection between the MFP server 300 and the MFP device control unit 700 as well, a fewer number of logical channels than those in FIGS. 5A and 5B could be utilized.

Figure 6:
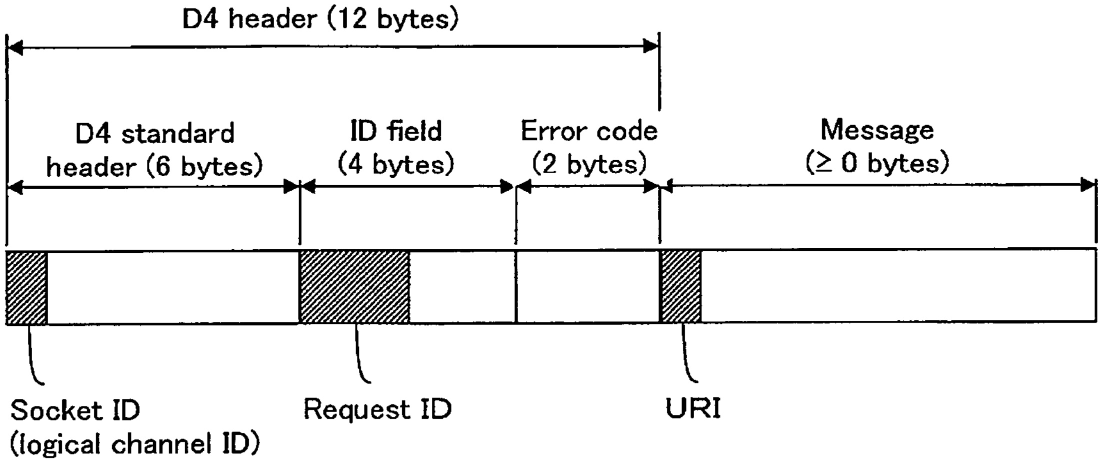
FIG. 6 illustrates the arrangement of a logical packet used in USB transfer via the printer interface.

FIG. 6 is an illustration depicting the configuration of the D4 packet used in USB transfer via the printer interface IF#0. The packet structure conforms to the IEEE 1284.4 standard. This D4 packet is composed of a 12-byte header, and a message composed of 0 or more bytes. The header contains the 6-byte D4 standard header, a 4-byte ID field, and a 2-byte error code field. In the D4 standard header is registered a socket ID (a logical channel ID) for identifying one of the 9 types or (7+Ndown+Nup) pieces of logical channels depicted in FIG. 5B. A request ID is registered in the ID field. This request ID is used for the purpose of identifying packets making up a given message during data transfer, particularly over the UPNP-DOWNCONTENTx channel and the UPNP-UPCONTENTx channel, between the MFP server 300 and the MFP device control unit 700. In some instances the request ID is assigned by the MFP server 300, while in other instances it is assigned by the MFP device control unit 700. Consequently, in preferred practice the request ID will be furnished with a bit (e.g. the most significant bit) for uniquely identifying whether it has been assigned by the MFP server 300 or the MFP device control unit 700. This request ID may be also referred to as a "job ID."

In the D4 packet, various logical channels can be identified using the header, thereby making it possible to carry out transmission of various kinds of data using various logical channels. Since the header information other than the D4 standard header can be established arbitrarily to a certain extent, the D4 packets advantageously provide a high degree of freedom in how execution of various controls is designed.

Where the D4 packet of the embodiment is used for transmitting a request, to the head of the message (also termed the "message header") coming after the error field there is appended a URI (normally a relative URI) notifying the destination or recipient from the message sender. From this URI it is possible for the message recipient to readily determine the content and address of the request.

As shown in FIG. 5B, in this embodiment the print port logical channels C#11-CH#12 and the UPnP logical channels CH#21-CH#27x are provided separately as logical channels for USB transfer between the MFP server 300 and the MFP device control unit 700. Accordingly, print data being transferred to the MFP device control unit 700 via a network print port can be readily distinguished from content data (e.g. XHTML data for printing) being transferred to the MFP device control unit 700 via a UPnP port. Additionally, in this embodiment, since a plurality of logical channels CH#21-CH#27x for different applications are provided for the purpose of USB transfer of messages by UPnP protocol, it is possible for processing of message content to be faster on the message receiving end. In this embodiment in particular, apart from the logical channels CH#23-CH#27x used during communication with the control point, there are separately provided logical channels CH#21, CH#22 used for transfer of local information between the MFP server 300 and the MFP device control unit 700. Consequently, a message sent from a client or a control point can be readily distinguished from specific information shared between the MFP server 300 and the MFP device control unit 700, so processing appropriate for each can be executed rapidly.

Figure 7:
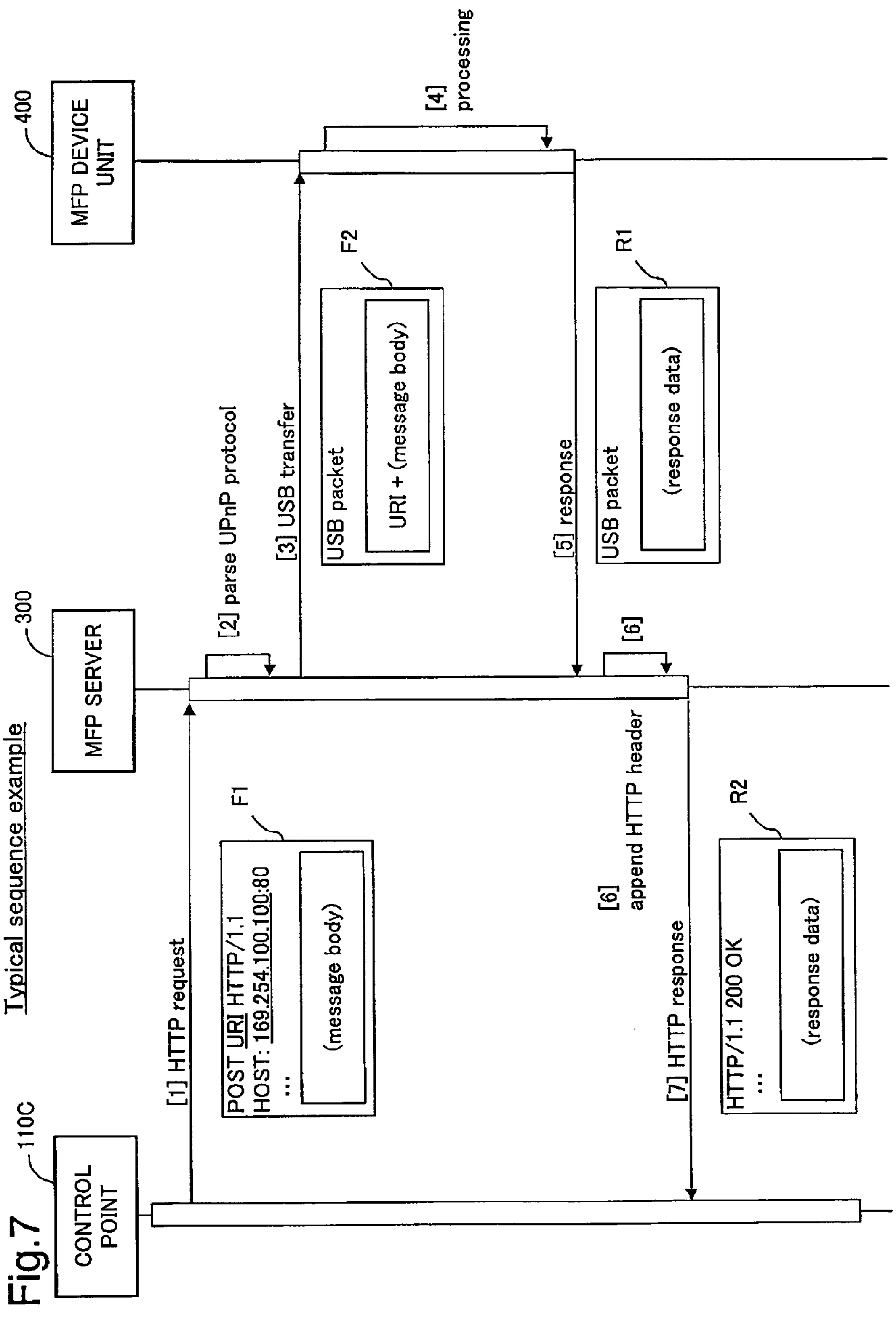
FIG. 7 is a sequence diagram depicting a typical example of a process utilizing UPnP architecture.

FIG. 7 is a sequence diagram depicting a typical example of a process utilizing UPnP architecture. Here, there is depicted an instance of message transfer among a control point 110C, the MFP server 300, and the MFP device control unit 700. Actually various control data and status information are exchanged between the MFP device control unit 700 and the multifunction peripheral device 800, but they are not shown here for the simplicity of illustration. In Step 1, the control point 110C transfers an HTTP request message F1 to the MFP server 300. It should be noted that the step numbers are enclosed by brackets in the sequence diagrams. The header of the message F1 describes a request command method (e.g. POST or GET), the URI of an address within the MFP device control unit 700, and the host name of the network device 900 including the relay device 600 and the multifunction peripheral device 800 shown in FIG. 1 (in this example, the IP address "169.254.100.100"). Since the network device 900 is assigned a single IP address, it is possible to think of this IP address as either the IP address of the MFP server 300, or the IP address of the MFP device control unit 700, or the IP address of the multifunction peripheral device 800.

In Step 2, the MFP server 300 parses the request message F1. Here, only the header portion of the message F1 is parsed or interpreted; the content of the transmission data (i.e. the message body) is not interpreted. More specifically, in Step 2, the URI of the message F1 is parsed to determine which logical channel should be used for transferring the massage to the MFP device control unit 700. In certain instances, however, the request message F1 may lack a substantial message body.

In Step 3, the MFP server 300 transfers the message F2 containing the URI and the message body (where present) to the MFP device control unit 700 by USB. During this transfer, a logical channels selected with reference to the URI is used.

In Step 4, the MFP device control unit 700 executes processing with reference to the URI and the message body (where present) in the received message F2. For example, the MPF device control unit 700 parses or interprets the content of the message body to produce control data for the multifunction peripheral device 800, and transfers the control data to the multifunction peripheral device 800. In Step 5, the MFP device control unit. 700 transfers by USB to the MFP server 300 a message R1 which includes response data. In Step 6, the MFP server 300 appends an HTTP header to the transmission data. This HTTP header includes a status code indicating the result of processing the HTTP request. For example, where the process result is OK, the status code is set to "200" whereas if there is an error it is set to "500." In Step 7, an HTTP response message R2 created in this way is transferred from the MFP server 300 to the control point 110C.

In this way, in this embodiment, from a request message received from a control point, the MFP server 300 performs parsing (interpretation) of the header of the message, without interpreting the content of the message body, and the message body is processed by the MFP device control unit 700. This arrangement has advantages such as the following. A first advantage is that the MFP server 300 does not need to ascertain the device configuration and service content of the device unit (the multifunction peripheral device 800), allowing it to function as a network protocol controller for transferring messages destined for a device unit of any configuration. A second advantage is that even if the device configuration or service content of the device unit should change, there is no need to modify the configuration or functions of the MFP server 300. A third advantage is that since there is no need for the MFP server 300 to mount an interpreter or parser for interpreting the content of the message body, a simpler configuration for the MFP server 300 will suffice.

C. Configuration and Device Description of Multi Function Device

Figure 8:
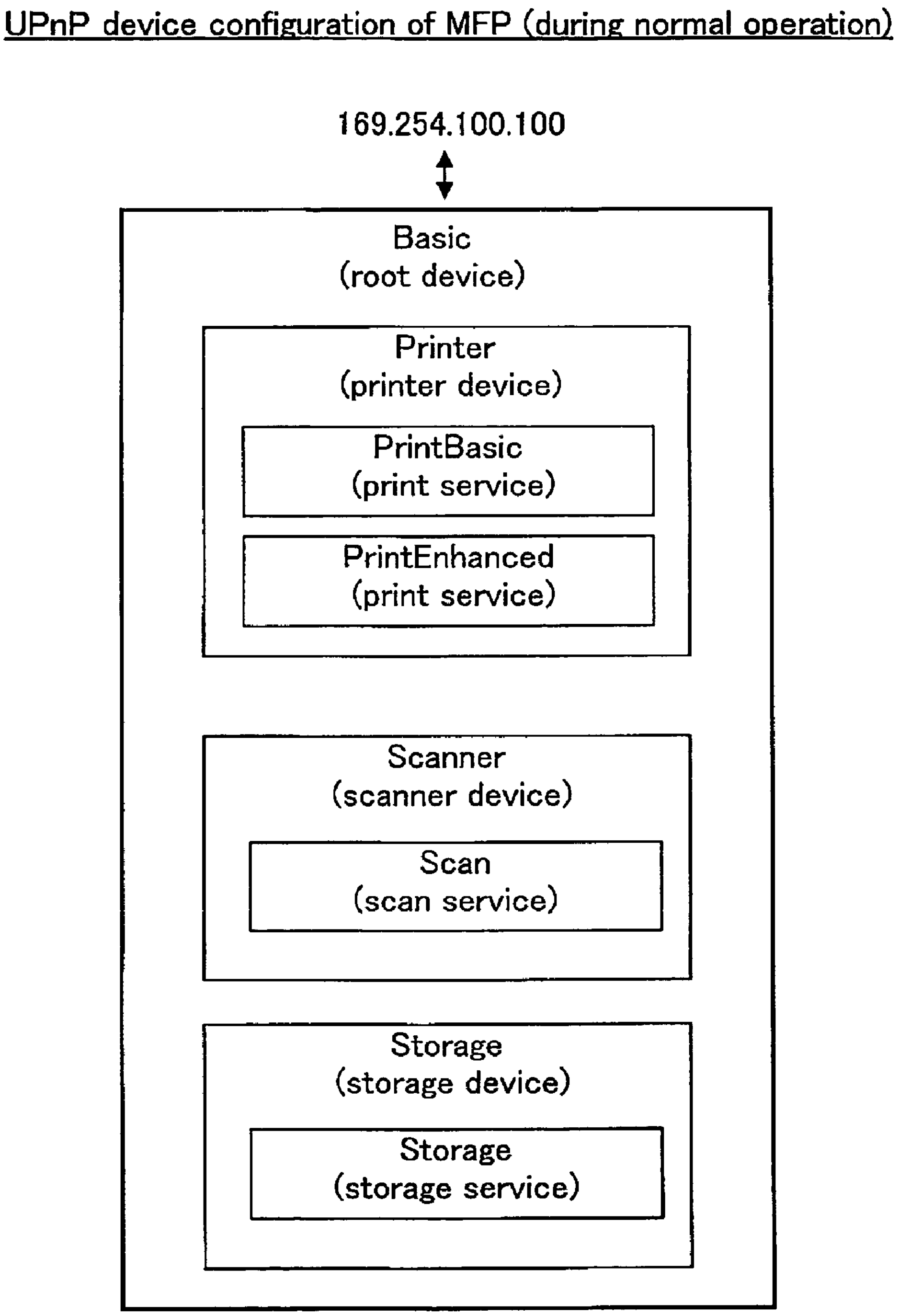
FIG. 8 illustrates UPnP device configuration in the embodiment.

FIG. 8 is an illustration depicting the device configuration of the multifunction peripheral device 800 according to the UPnP protocols. In the configuration of the multifunction peripheral device 800 of this embodiment (or more correctly the network device 900) as a UPnP device, a basic device serving as the root device includes a printer device, a scanner device, and a storage device. In other words, the printer device, the scanner device, and the storage device are nested devices within the basic device. The basic device is a standard device standardized by UPnP, and has no actual services executed by the device per se.

The printer device has two print services, "PrintBasic" and "PrintEnhanced." These two services are standard print services standardized according to UPnP. The scanner device "Scanner" has a scan service "Scan," while the storage device "Storage" has a storage service "Storage." Each service is composed of a state table, a control server, and an event server. State variables indicating service states are registered in the state table. The control server receives an action request from a control point and executes a requested process. The event server, in the event of a change in the value of a state variable, notifies the control points of the change, by way of an event. The control points targeted for the notification are those that have previously subscribed to the service.

Herein, a device that includes a service is called a "service device." As will be understood from FIG. 8, it is possible for each service device to include any number of services equal to one or more. It is also possible for a given service device to have a device architecture that includes another service device.

It would also be possible not to use a basic device, but to establish the printer device as the root device, with the other devices (the scanner and storage) configured as nested devices of the printer device.

As shown in FIG. 8, in this embodiment, only a single IP address is assigned to the network device 900, which has the advantage that the control point, using this single IP address, can access the various service devices of the multifunction peripheral device 800.

Each UPnP compliant device stores its own configuration and functions in the form of a device description, and has the function of providing its device description in response to a request from a control point. Service specifics are stored in the device in the form of a service description, which is provided to a control point when requested. In the example of FIG. 8, device descriptions of the three devices and service descriptions of the four services have been stored in advance by the description creating module 710 in the MFP device control unit 700.

FIG. 9 depicts an example of the device description of the multifunction peripheral device 800, described in XML. The underlined sections indicate settings unique to this embodiment. The content of the <URLBase> element, i.e., "http://169.254.100.100:80" includes the host name (here, the IP address) of the network device 900, and a port number for the event that HTTP is used. The various URIs in the description are written as relative addresses with respect to this IP address. Herein, the term URI (or URL) is used to include both instances where written with an absolute address, and instances where written with an relative address. Hereinbelow, a relative address with respect to an IP address shall be called a "path name."

Below the <root> element is a single <device> element; this element in turn includes three <device> elements. The first <device> element is a basic device (root device); the three devices below it are a printer device, a scanner device, and a storage device.

The content indicated below is described in the description for the printer device.

<Presentation URL>: the URL to be used when a control point acquires the presentation page of the printer device. This URL is composed of the path name "/PRESENTATION/PRINTER."

<serviceList>: a list of services provided by the printer device.

<serviceType>: the types of services provided by the printer. "PrintBasic" and "PrintEnhanced" are standard print services in UPnP architecture.

<SCPDURL>: the path name of the device description for the printer.

<controlURL>: the path name of the control server in the printer device. The control server is a server that provides a control point with a control function (a process wherein a control point transfers to a device a control message that contains an action request, to perform control of the device), and is typically included among the services of a UPnP device.

<eventSubURL>: the path name of the event server within the printer device. The event server is a server for issuing an event to subscribing control points, and is typically provided among device services.

The scanner and storage device descriptions describe items similar to the items for the printer. While device descriptions additionally describe a device friendly name, manufacturer name, model, icons and various other properties, these have been omitted from the illustration here.

The device description will preferably be constituted so as to include at least information indicating the URI (URLBase) and the device type (Basic or Printer) of the device unit as a whole; this is normally described in XML. Where a device includes a service, it is preferable for the device description to include the service type (PrintBasic or PrintEnhanced), the address of the control server of the service, and the address of the event server.

D. Embodiment 1

Figure 10:
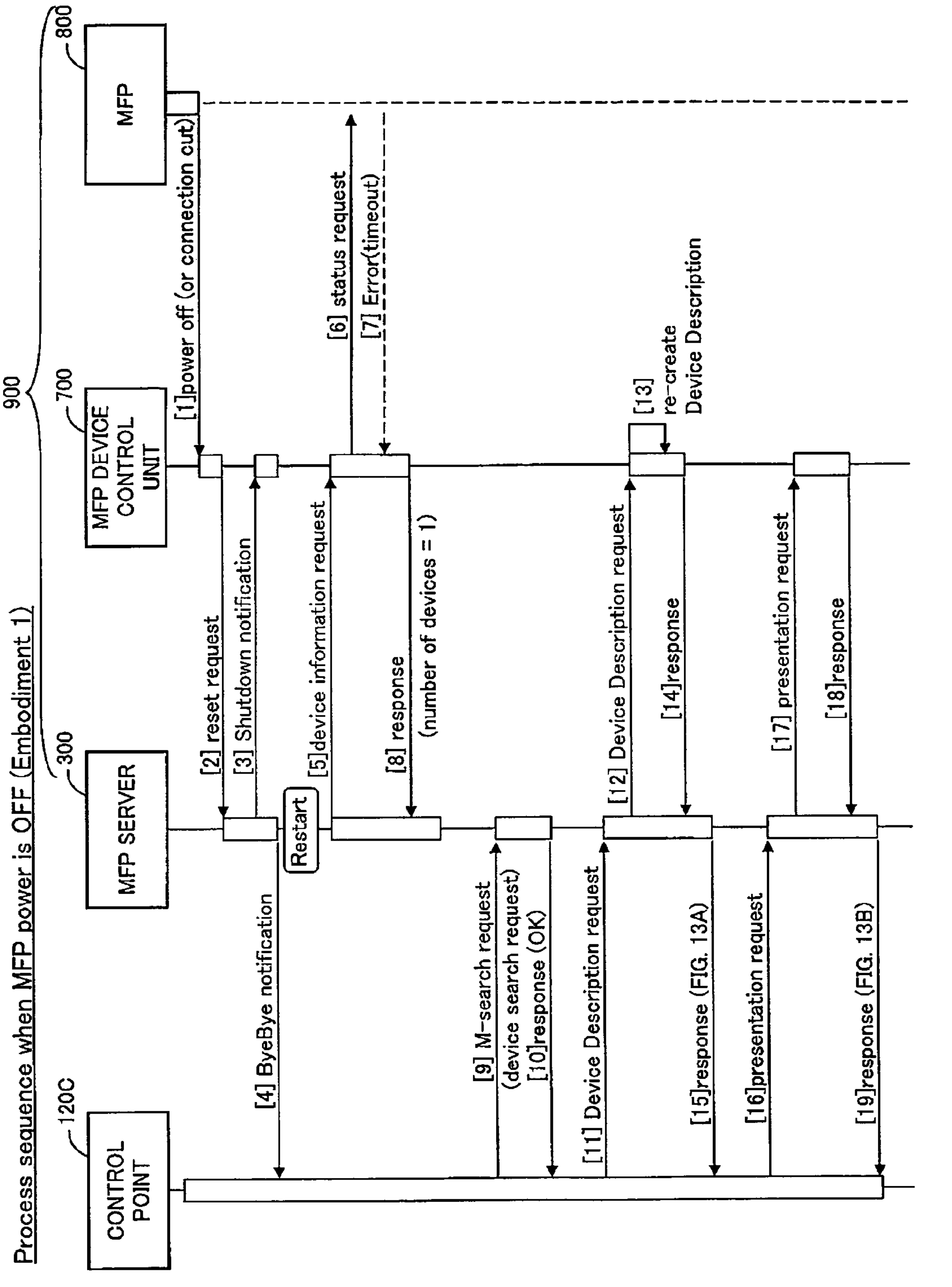
FIG. 10 is a sequence diagram depicting the process sequence in Embodiment 1.

FIG. 10 is a sequence diagram depicting the process sequence in Embodiment 1. In Embodiment 1, there will be described the process that takes place when the power supply of the multifunction peripheral device 800 has been turned off, or the USB connection between the multifunction peripheral device 800 and the relay unit 600 has been severed.

In Step 1, the MFP device control unit 700 is notified by the multifunction peripheral device 800 when the power supply of the device 800 is turned off, or when the USB connection between the device 800 and the relay unit 600 is severed. Instead of the multifunction peripheral device 800 providing notification, it would be possible for the MFP device control unit 700 to periodically poll the status of the device 800 to detect powering off of the device 800 or severing of the USB connection. Severing of the USB connection is also termed "loss of USB connection." Here, "loss of USB connection" refers not only to physical disconnection of a cable or connector, but in the wider sense to include instances where communication is disabled for longer than a prescribed time interval.

Upon ascertaining powering off of the multifunction peripheral device 800, in Step 2 the MFP device control unit 700 sends a reset request to the MFP server 300. In Step 3, the MFP server 300 sends a shutdown notification to the MFP device control unit 700 as a response to the reset request. In Step 4 the MFP server 300 multicasts a ByeBye notification to the control points in the network. The shutdown notification is a notification to the effect that the MFP server 300 will perform a restart. The ByeBye notification is a notification in UPnP protocols, informing all of the control points that an MFP device will be pulled from the network. The reason that the MFP server 300 multicasts a ByeBye notification and performs a restart is that in the UPnP standard, these operations must be carried out when re-creating a device description. The MFP server 300 subsequently restarts. The MFP device control unit 700 may restart together with the MFP server 300. It is also possible to omit Steps 2-4 and the MFP server 300 restart.

In Step 5 in FIG. 10, the MFP server 300 requests the MFP device control unit 700 for device information. This request for device information is a process carried out when the MFP server 300 restarts, and is carried out so that the MFP server 300 can acquire device information of various kinds, including the number of service devices belonging to the UPnP complaint network device 900, the number of services, the device type of each service device, and the service type of each service. In Step 6, the MFP device control unit 700, by means of forwarding a status request to the multifunction peripheral device 800 in response to this device information request, requests information regarding the service devices and services that the device 800 is able to provide. However, since the multifunction peripheral device 800 is currently turned off, there is no response to the status request. If a prescribed time interval passes after a status request is made, the MFP device control unit 700 decides that a timeout error has occurred (Step 7). In this case the MFP device control unit 700 notifies that the number of devices is 1 in Step 8 in response to the device information request. Here, the reason that the number of devices is 1 is that the description creating module 710 in the present embodiment is designed to create a description that includes the basis device only in Step 13, when the multifunction peripheral device 800 is turned off.

FIG. 11 is an illustration of an example of a device description when the multifunction peripheral device 800 is turned off. As can be appreciated from a comparison with the device description during normal operation in FIG. 9, when the power is off, descriptions relating to devices that provide actual services (the printer, scanner, storage) have been deleted, leaving the basic device which provides no actual services, as the only remaining device. In preferred practice, a presentation URL of the basic device (the URL of a Web page for provision to clients) will be described in advance for the purpose of displaying to clients a screen relating to the multifunction peripheral device 800, even when the power is off. In the example of FIG. 11, the relative address "/PRESENTATION/BAIC" is described as the presentation URL of the basic device.

Figure 12A:
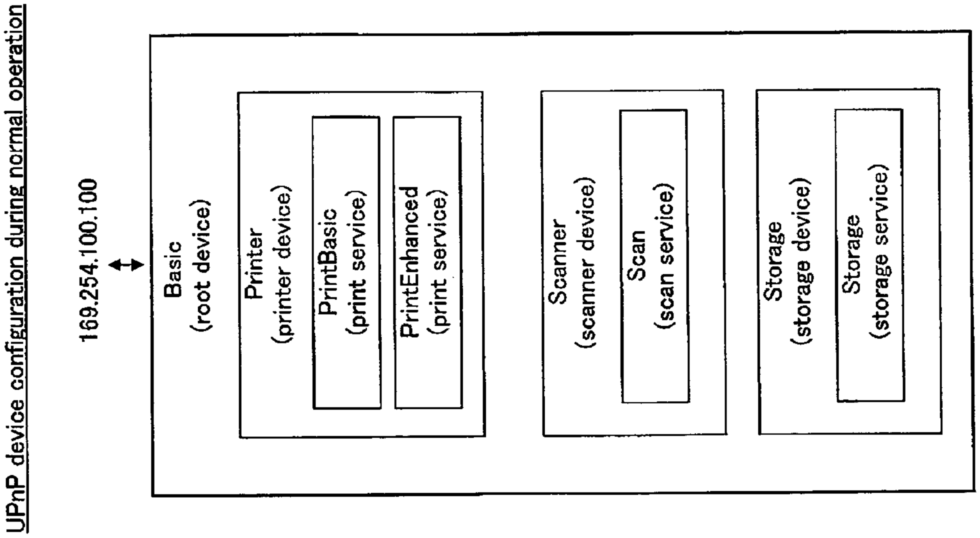
FIGS. 12A and 12B illustrate a comparison of the device configuration of the network device during normal operation and when the multifunction peripheral device is turned off.
Figure 12B:
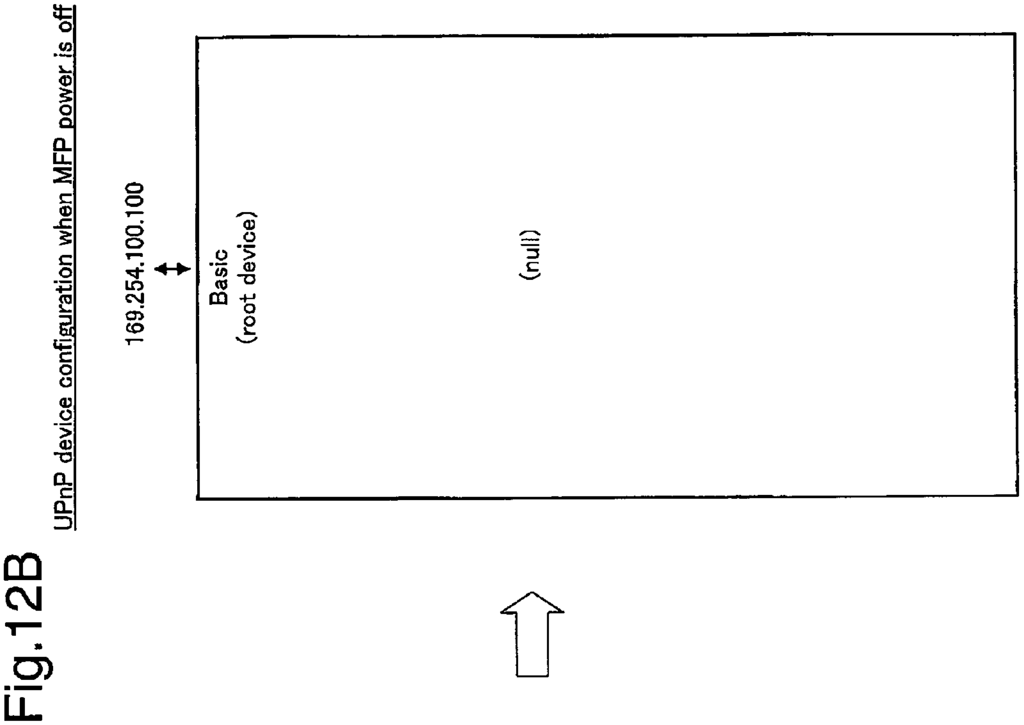

FIGS. 12A and 12B illustrate a comparison of the device configuration of the network device 900 during normal operation and when the multifunction peripheral device 800 is turned off. As will be understood from the drawings, when the multifunction peripheral device 800 is turned off, there is created a device description in which the network device 900 appears composed only of a basic device having no services provided to clients.

In Step 8 in FIG. 10, in addition to notification to the effect that the number of devices is 1, notification to the effect that the device type is "Basic" and the number of services is 0 is also provided. The request and response in Steps 5 to 8 may be repeated multiple times in order for the MFP server 300 to acquire the multiple kinds of information. The process up to this Step 8 is a process carried out when the multifunction peripheral device 800 is turned off.

In the example of FIG. 10, in the subsequent Step 9, an M-Search request is multicast from the control point 120C. In the UPnP protocols, an M-Search request is issued for the purpose of a control point to search for a service device. In response to this request, all UPnP compliant network devices connected to the network send a response to the control point 120C originating the request in Step 10.

Subsequently, the control point 120C requests each individual network device to transfer a device description in Step 11. The MFP server 300 transfers this request to the MFP device control unit 700 in Step 12, whereupon the control unit 700 re-creates the device description described in FIG. 11 in Step 13. The MFP device control unit 700 may re-create the device description at some point prior to this.

Figure 13A:
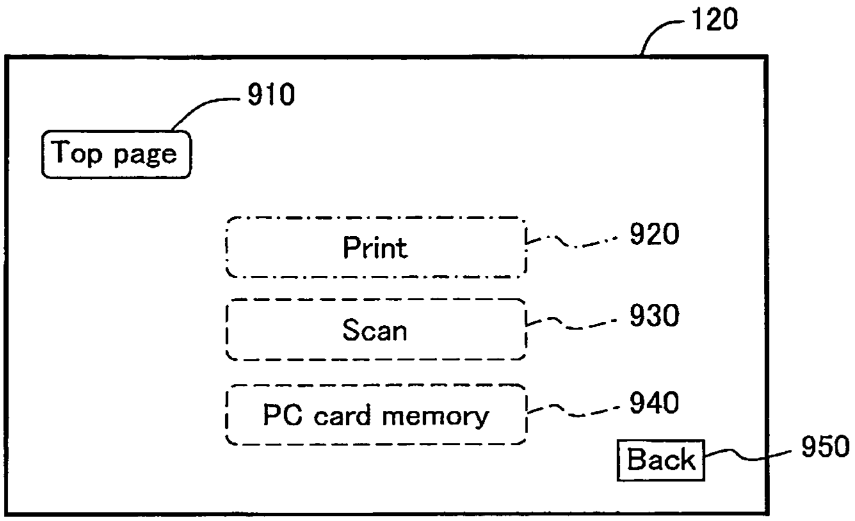
FIGS. 13A and 13B illustrate examples of screens displayed on the digital TV set in Embodiment 1.

The device description created in this way is forwarded from the MFP device control unit 700 to the MFP server 300 in Step 14, and then forwarded to the control point 120C in Step 15. FIG. 13A depicts an exemplary screen displayed on the control point 120C (the digital TV set 120 of FIG. 1) in accordance with this device description. This screen contains several buttons 910-950 for using services provided by the multifunction peripheral device 800 (the printer, scanner, and storage by means of PC card memory). Since the device description illustrated in FIG. 11 contains no service-providing devices whatsoever, on the screen of FIG. 13A, the buttons 920, 930, 940 for selecting these services are displayed in unselectable format. The digital TV set 120 has the function of adjusting the display mode of the display screen depending on the device description. However, rather than providing this function in the digital TV set 120, it would be possible instead for data representing such a screen (e.g. a Web page) to be created by the MFP device control unit 700 or the MFP server 300 and then transferred to the control point 120C.

In the screen of FIG. 13A, if the user clicks on the button 910 requesting the "Top Page" a request for the presentation screen is forwarded from the control point 120C to the MFP server 300 in Step 16 of FIG. 10. This presentation request is a request to transfer the page identified by the relative address "/PRESENTATION/BASIC" given in the presentation URL which is described in the device description shown in FIG. 11. This presentation request is forwarded from the MFP server 300 to the MFP device control unit 700, and the Web page describing the presentation screen is sent in response in Steps 18, 19.

Figure 13B:
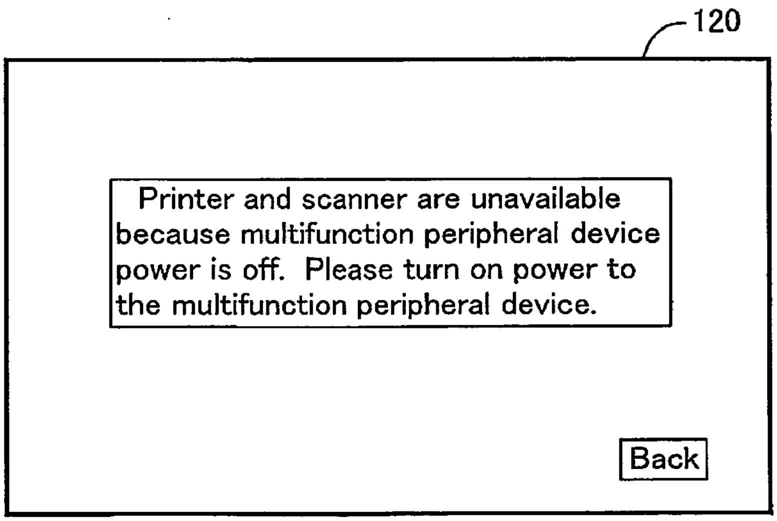

FIG. 13B shows an example of a presentation screen transferred to the control point 120C in Step 19 of FIG. 10. In this example, it is assumed that the multifunction peripheral device 800 is turned off and thus cannot be used.

Communications in Steps 2 and 3 in FIG. 10 take place through the UPNP-LOCALEVENT channel shown in FIG. 5B; communications in Steps 5, 8, 12, 14, 17, and 18 take place through the UPNP-LOCALCONTROL channel. However, these communications could take place through other logical channels as well.

As described above, in Embodiment 1, when the multifunction peripheral device 800 is turned off, or when the connection between the relay unit 600 and the multifunction peripheral device 800 has been lost, a device description (FIG. 11) that includes only a basic device having no services provided to clients is created. Accordingly, when a client, or a control point, receives this device description, it can ascertain that the status of the multifunction peripheral device 800 is such that no services can be provided. Since the client will therefore not make useless attempts to access the network device 900 in order to request services, it is possible to increase communication efficiency in the network.

E. Embodiment 2

Figure 14:
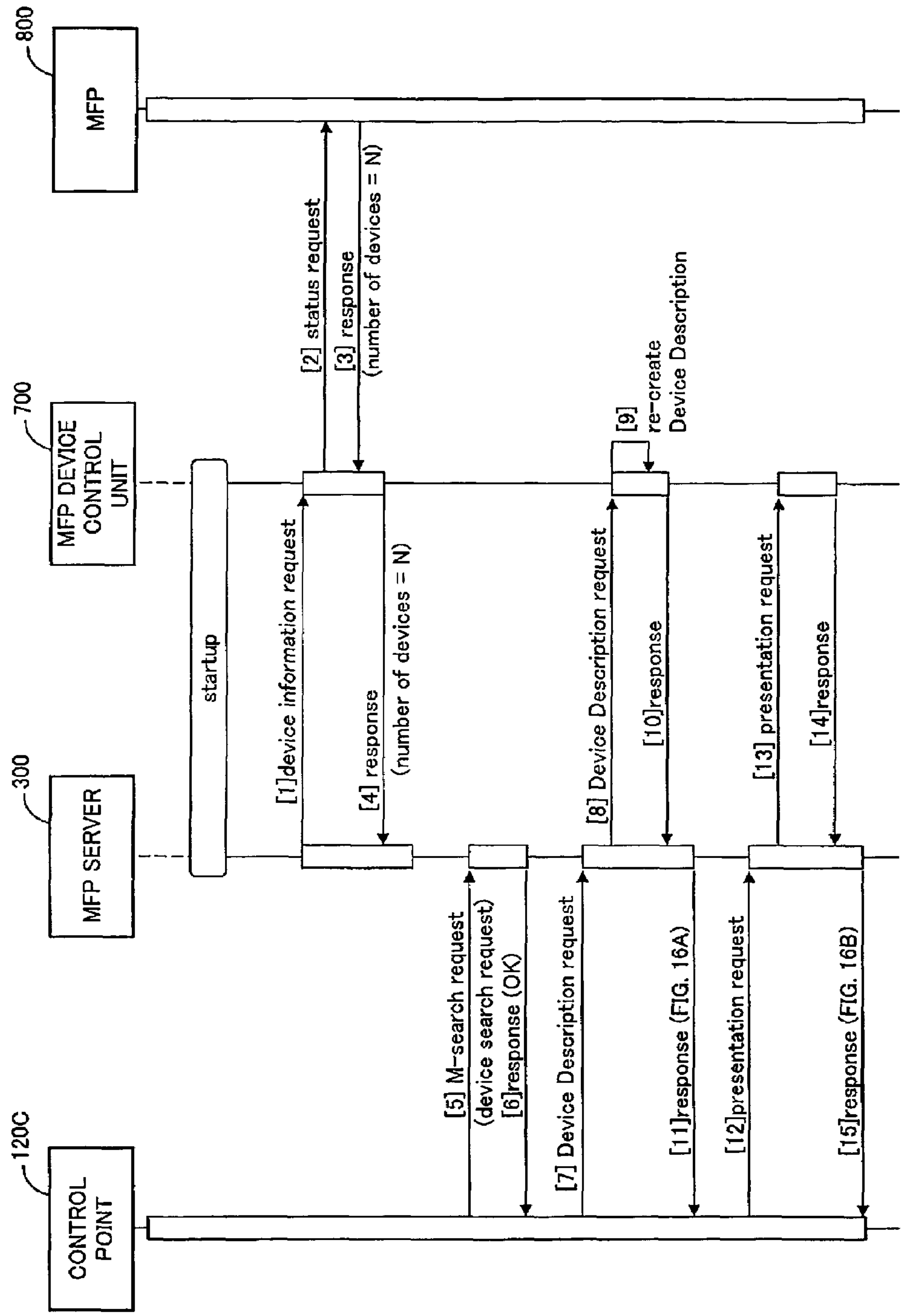
FIG. 14 is a sequence diagram depicting the process sequence in Embodiment 2.

FIG. 14 is a sequence diagram depicting the process sequence in Embodiment 2. In Embodiment 2, there will be described the process that takes place when a problem with the multifunction peripheral device 800 is present during startup of the relay unit 600.

When the relay unit 600 composed of the MFP server 300 and the MFP device control unit 700 is started up, the MFP server 300 requests the control unit 700 for device information in Step 1. This device information request is the same as the request of Step 5 of FIG. 10. In response to this device information request, the MFP device control unit 700 forwards a status request to the multifunction peripheral device 800 in Step 2, and the multifunction peripheral device 800 sends back a response in Step 3. Here, various kinds of device information, including the number N (N is an integer equal to 1 or greater) of devices that are currently operational, is sent back. For example, let it be assumed that, of the three service devices 810, 820, 830 (FIG. 1) that are available during normal operation, the print engine 810 has encountered a problem to be out of service. In this case, the response includes N=2 indicating the number of currently operational service devices, and the operational device types indicating the scanner and the storage by PC card interface. This response is forwarded from the MFP device control unit 700 to the MFP server 300 as well in Step 4.

Figures 15A, 15B:
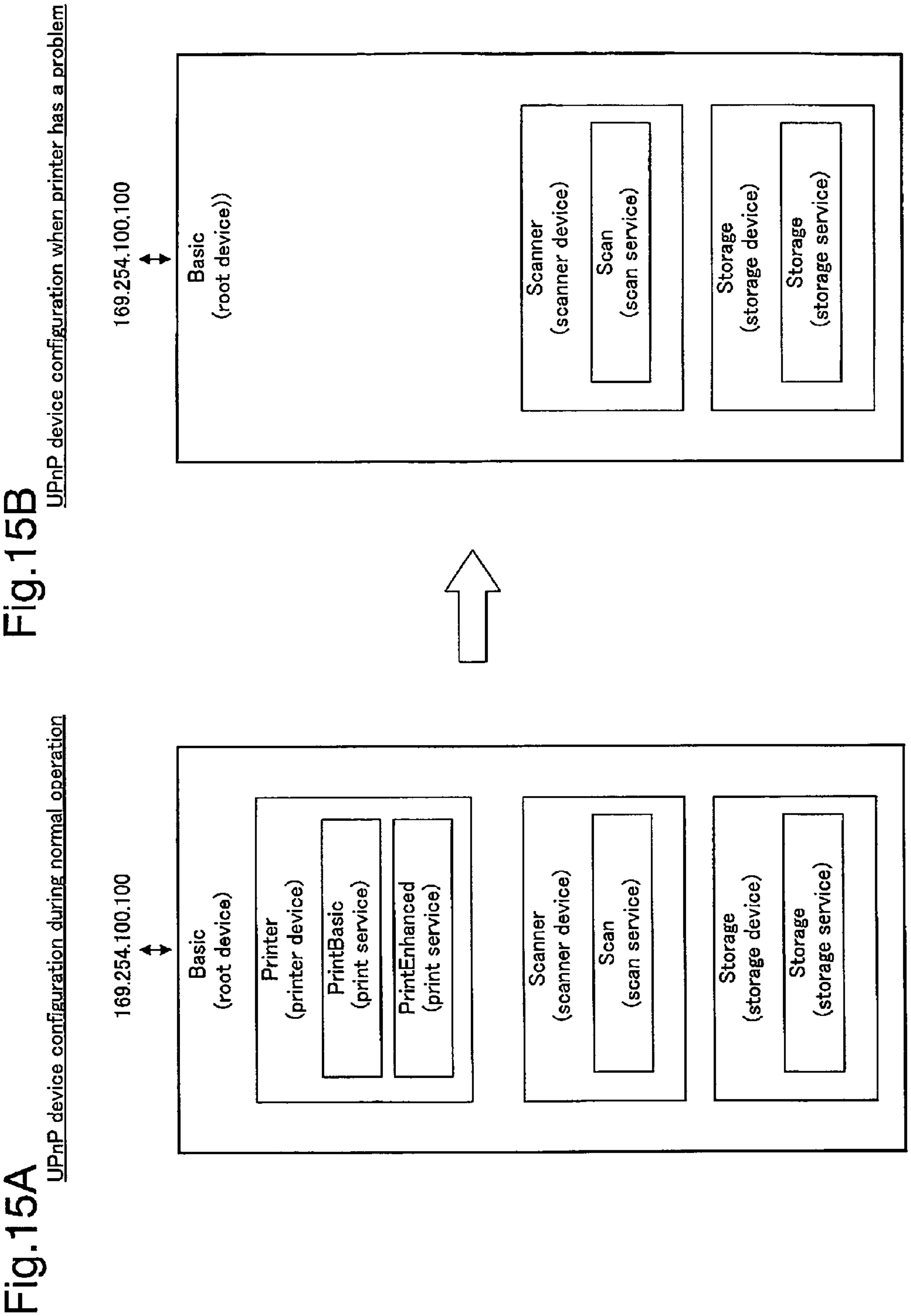
FIGS. 15A and 15B illustrate a comparison of the device configuration of the network device during normal operation and when the multifunction peripheral device has encountered a problem.

The process of Steps 5-15 of FIG. 14 is basically the same as the process of Steps 9-19 of FIG. 10 and will not be described in detail. FIGS. 15A and 15B illustrate a comparison of device configuration where the print engine 810 has encountered a problem, with the device configuration during normal operation. In the example of FIG. 15B, since the print engine 810 has encountered a problem and cannot be used, the printer device and its services are not included in the basic device, which is shown to include only the scanner device and the storage device. The device description created in Step 19 of FIG. 14 is what is obtained by deleting the printer device portion from the description shown in FIG. 9.

Figure 16A:
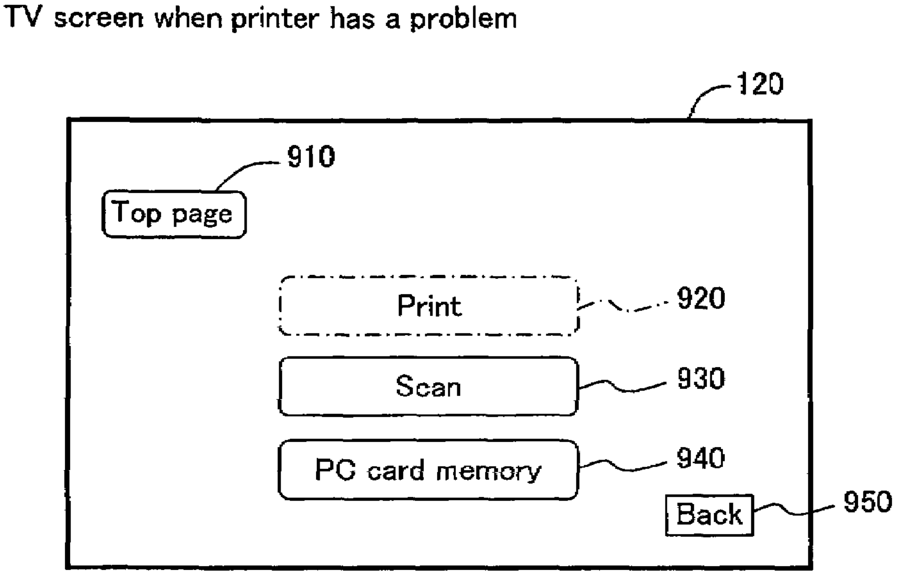
FIGS. 16A and 16B illustrate examples of screens displayed on the digital TV set in Embodiment 2.

FIG. 16A depicts an example of a screen displayed on the digital TV set 120 according to the response of Step 11 of FIG. 14. On this screen, of the three buttons 920, 930, 940 for selecting services of the multifunction peripheral device 800, the button 920 corresponding to the device with the problem is displayed in unselectable format.

Figure 16B:
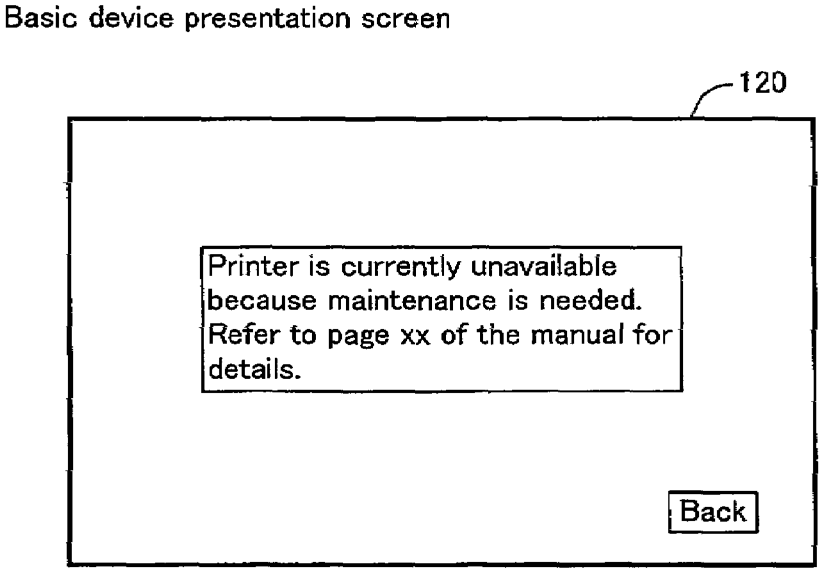

FIG. 16B depicts an example of a presentation screen transferred to the digital TV set 120 according to the response of Step 15 of FIG. 14. This example describes a case where the printer cannot be used due to the need for maintenance.

Problems which could render the print engine 810 unusable include waste ink overflow, sticking of the print head to the cartridge (rendering it inoperative), or the like. Problems which could render the scanner engine 820 unusable include scanner lamp malfunction (lamp burnout). When such predictable problems occur, the multifunction peripheral device 800 notifies the MFP device control unit 700 that a problem has occurred, in its response to the status request in Steps 3, 22 in FIG. 14.

In this way, in Embodiment 2, if one or more of service devices among the plurality of service devices 810, 820, 830 belonging to the multifunction peripheral device 800 encounter a problem during startup of the relay unit 600, rendering it inoperative, a device description that deletes the device will be created. Consequently, when clients receive the device description, it is possible for them to ascertain that some device services cannot be provided under the circumstances.

F. Embodiment 3

Figure 17:
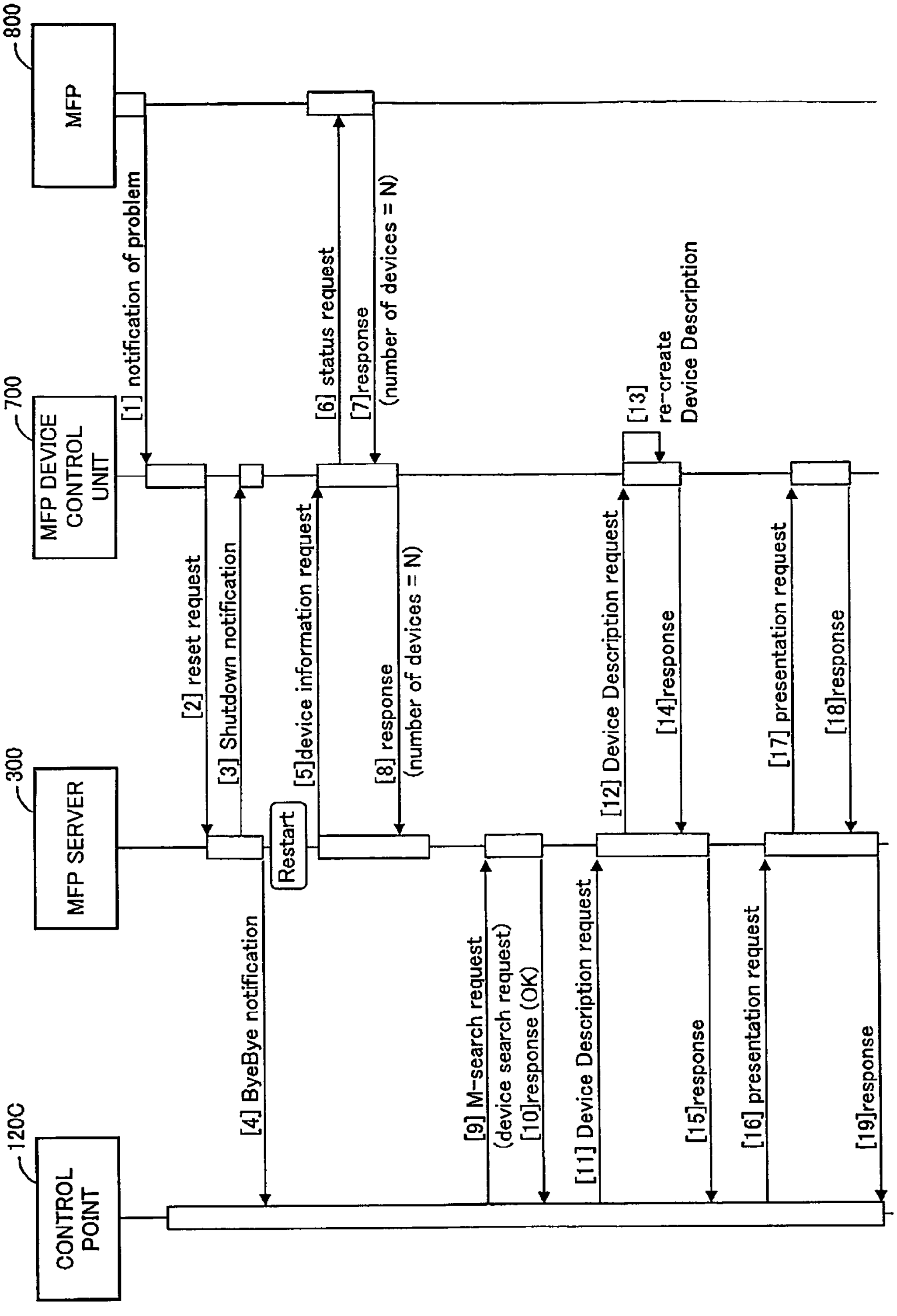
FIG. 17 is a sequence diagram depicting the process sequence in Embodiment 3.

FIG. 17 is a sequence diagram depicting the process sequence in Embodiment 3. In Embodiment 3, there will be described the process that takes place in the event of a problem occurs with a service device in the multifunction peripheral device 800 while both the relay unit 600 and the device 800 are in operation.

In Step 1, the multifunction peripheral device 800 notifies the MFP device control unit 700 that a service device in the multifunction peripheral device 800 has encountered a problem. In preferred practice, at this time the MFP device control unit 700 will cancel the process currently being executed by the multifunction peripheral device 800, and place the device 800 in idle mode.

The process beginning with Step 2 is basically the same as that beginning with Step 2 in FIG. 10. Specifically, the MFP server 300 restarts and re-creates a device description that reflects the operating status of the multifunction peripheral device 800, and UPnP services will be provided according to this device description. In Embodiment 3, as long as some service devices in the multifunction peripheral device 800 are operable, in Step 7 of FIG. 17, status information will be sent back from the device 800 to the MFP device control unit 700, so this point differs from the process in FIG. 10. Other points are substantially the same as Embodiment 1 (FIG. 10) and Embodiment 2 (FIG. 14), and will not be described in detail.

In the above manner, in Embodiment 3, when one or more service devices among the plurality of service devices 810, 820, 830 belonging to the multifunction peripheral device 800 encounters a problem and becomes inoperative during operation of the device 800, a device description that deletes this device is created. Consequently, it is possible for clients receiving the device description to ascertain that the inoperative device or devices is in no condition to provide service.

G. Embodiment 4

Figure 18:
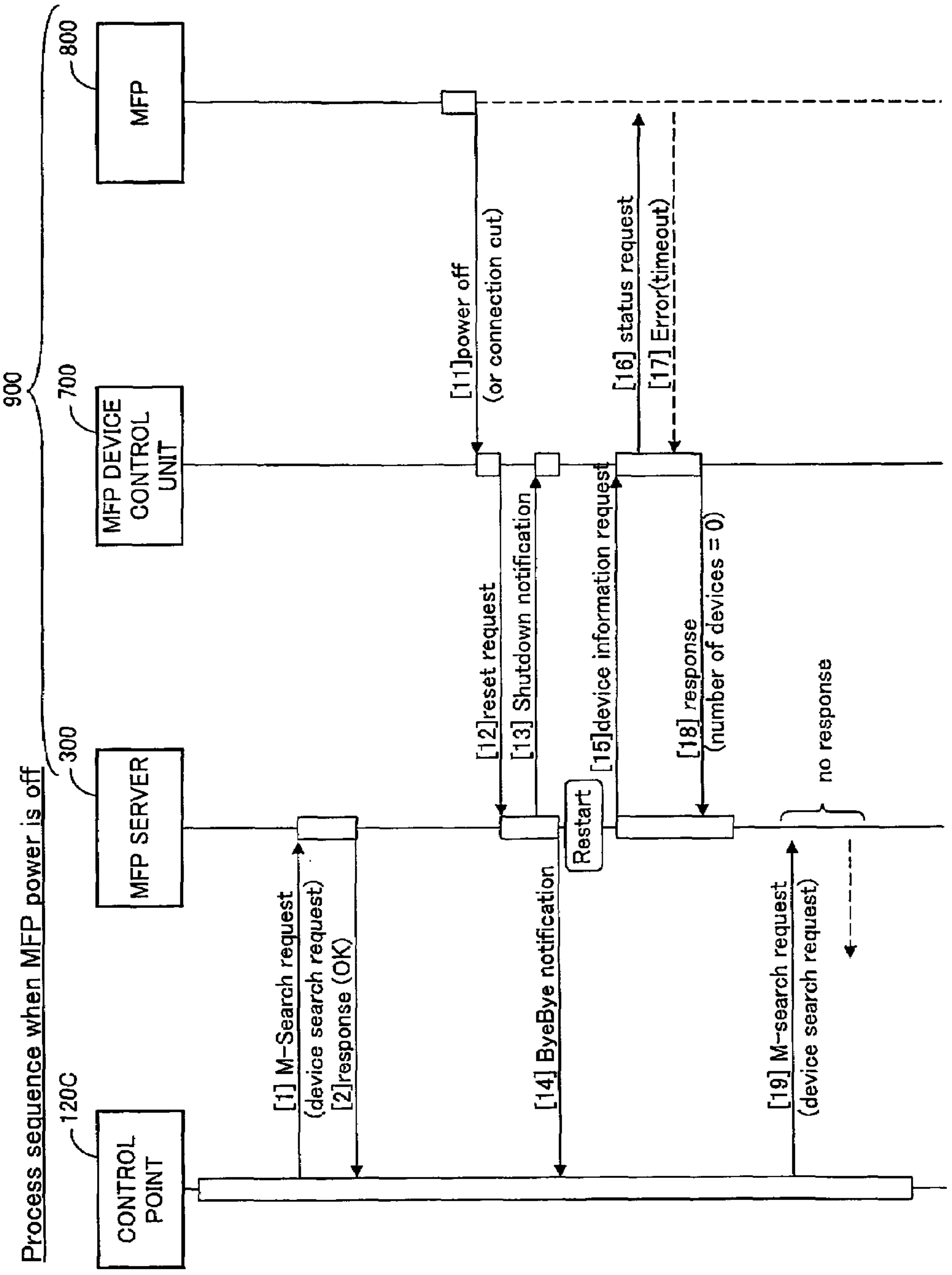
FIG. 18 is a sequence diagram depicting the process sequence in Embodiment 4.

FIG. 18 is a sequence diagram depicting the process sequence in Embodiment 4. In Embodiment 4, there will be described the process that takes place in the event that the power supply of the multifunction peripheral device 800 has been turned off, or the USB connection between the device 800 and the relay unit 600 has been severed.

In Step 1, an M-Search request is multicast from the control point 120C. In the UPnP protocols, an M-Search request is issued for the purpose of a control point to search for a service device. In response to this request, all UPnP compliant network devices connected to the network send a response to the control point 120C originating the request in Step 2. In the network device 900 of the present embodiment, the network protocol controller 302 (FIG. 1) sends back this response. Upon receiving this response, the control point 120C ascertains whether the network device 900 is in a condition of being able to provide services, and then sends various requests to the network device 900 as needed. FIG. 7 discussed previously is an example of the process sequence of the service request and its response.

When the network device 900 is operating normally, in some instances the multifunction peripheral device 800 power may be off, or the USB connection between the device 800 and the relay unit 600 may have been severed. Step 11 and the following steps depict the process sequence in this case.

In Step 11, the MFP device control unit 700 is notified by the multifunction peripheral device 800 when the power supply of the device 800 is turned off, or when the USB connection between the device 800 and the relay unit 600 is severed. Instead of the multifunction peripheral device 800 providing notification, it would be possible for the MFP device control unit 700 to periodically poll the status of the device 800 to detect powering off of the device 800 or severing of the USB connection. Severing of the USB connection is also termed "loss of USB connection." Here, "loss of USB connection" refers not only to physical disconnection of a cable or connector, but in the wider sense to include instances where communication is disabled for longer than a prescribed time interval.

Upon ascertaining powering off of the multifunction peripheral device 800, the MFP device control unit 700 sends a reset request to the MFP server 300 in Step 12. In Step 13, the MFP server 300 sends a shutdown notification to the MFP device control unit 700 as a response to the reset request. In Step 14 the MFP server 300 multicasts a ByeBye notification to the control points in the network. The shutdown notification is a notification to the effect that the MFP server 300 will perform a restart. The ByeBye notification is a notification in the UPnP protocols, informing all of the control points that an MFP device will be pulled from the network. Then the MFP server 300 restarts. The MFP device control unit 700 may restart together with the MFP server 300. It is also possible to omit Steps 12-14 and the MFP server 300 restart.

In Step 15 in FIG. 18, the MFP server 300 requests the MFP device control unit 700 for device information. This request for device information is a process carried out when the MFP server 300 restarts, and is carried out so that the MFP server 300 can acquire service device information of various kinds, including the number of service devices belonging to the UPnP complaint network device 900, the number of services, the device type of each service device, and the service type of each service. In Step 6, the MFP device control unit 700, by means of forwarding a status request to the multifunction peripheral device 800 in response to this device information request, requests information regarding the service devices and services that the multifunction peripheral device 800 is able to provide. However, since the multifunction peripheral device 800 is currently turned off, there is no response to the status request. If a prescribed time interval passes after a status request is made, the MFP device control unit 700 decides that a timeout error has occurred (Step 17). In this case the MFP device control unit 700 notifies that the number of devices is 0 in Step 18 in response to the device information request. Here, the reason that the number of devices is 0 is that all the service devices within the network device 900 are out of service.

The process up to Step 18 of FIG. 18 is a process carried out when the multifunction peripheral device 800 is turned off.

In the example of FIG. 18, in the subsequent Step 19, an M-Search request is again multicast from the control point 120C. As mentioned previously, in response to the M-Search request, all UPnP compliant network devices connected to the network send a response to the control point 120C originating the request. However, since at the point in time of Step 19 all of the service devices in the multifunction peripheral device 800 are in inoperative condition, the MFP server 300 (the network protocol controller 302 of FIG. 1) is configured so as not to respond to the M-Search request. That is, while the relay unit 600 per se is in operational condition, since either the multifunction peripheral device 800 power is off or the USB connection between the device 800 and the relay unit 600 has been lost, the MFP server 300 is configured so as not to respond to the M-Search request.

It is conceivable that a condition in which all of the service devices in the multifunction peripheral device 800 are inoperative could have resulted from a cause other than the two mentioned above, namely, the device 800 power being off, or loss of USB connection. Generally speaking, in preferred practice the arrangement may be such that, in the event that at least one service device in the multifunction peripheral device 800 is in operative condition, the relay unit 600 sends back a response to an M-Search request (device search request) sent from a control point, whereas in the event that all of the service devices are in inoperative condition, it does not send back a response to an M-Search request.

In the present embodiment as described above, the relay unit 600 is configured such that in the event that all of the service devices in the multifunction peripheral device 800 are in inoperative condition, it will not send back a response to an M-Search request. By means of this configuration, clients (control points) do not recognize that the network device 900 is participating in the UPnP network, and therefore useless attempts by clients to access the network device 900 to request various services will be prevented. As a result, it is possible to increase communications efficiency in the network.

G. Variation Examples

The invention is not limited to the embodiments discussed above, and may be reduced to practice in various other forms without departing from the spirit thereof the following variations are possible, for example.

G1. Variation Example 1

Whereas in the preceding embodiments, the network device 900 includes a multifunction peripheral device 800 having a plurality of service devices, but it would be possible instead to employ a single-function network device that includes only a single service device (e.g. a printer). In other words, it is sufficient for the network device to have at least one service device.

G2. Variation Example 2

Some of the arrangements realized through hardware in the preceding embodiments could instead be replaced by software; conversely, some of the arrangements realized through software could be replaced by hardware.

What is claimed is:

1. A network relay device compliant with network plug-and-play protocols for relay between a network and a device unit having N service devices that provide a service in response to a request from a client on the network where N is an integer equal to 1 or greater, the network relay device comprising at least one of:

a description creating module configured to create a device description which describes service devices included in the device unit connected to the network relay device; and a response module configured to respond to a device search request sent from the client in accordance with the network plug-and-play protocols, wherein if one or more service devices among the N service devices belonging to the device unit are inoperative when the description creating module receives a request for a device description sent from the client, the description creating module creates a device description that does not include a description portion of the inoperative service devices and forwards the created device description to the client, wherein the response module responds to a device search request sent from the client if at least one service device in the device unit is in operative condition, while the response module does not respond to a device search request sent from the client if all of the service devices in the device unit are in inoperative condition, and wherein if all of the N service devices are inoperative, the description creating module creates a device description that includes only a basic device that provides no services to clients.

2. The network relay device according to claim 1, wherein events that induce service devices inoperative include:

(i) turning off of power supply to the device unit;

(ii) loss of connection between the device unit and the network relay device; and (iii) a problem in an individual service device causing the service device to be inoperative.

3. A network relay device compliant with network plug-and-play protocols for relay between a network and a device unit having N service devices that provide a service in response to a request from a client on the network where N is an integer equal to 1 or greater, the network relay device comprising at least one of:

a description creating module configured to create a device description which describes service devices included in the device unit connected to the network relay device; and a response module configured to respond to a device search request sent from the client in accordance with the network plug-and-play protocols, wherein if one or more service devices among the N service devices belonging to the device unit are inoperative when the description creating module receives a request for a device description sent from the client, the description creating module creates a device description that does not include a description portion of the inoperative service devices and forwards the created device description to the client, and wherein the response module responds to a device search request sent from the client if at least one service device in the device unit is in operative condition, while the response module does not respond to a device search request sent from the client if all of the service devices in the device unit are in inoperative condition, further comprising:

a device controller including the description creating module, for controlling operation of the device unit through exchanging information with the device unit; and a network protocol controller, coupled between the network and the device control unit, for receiving from a client over the network a message having a message header and a message body, and forwarding content of the message body to the device control unit;

wherein the network protocol controller interprets the message header in accordance with the network plug-and-play protocols, without interpreting the content of the message body received from the client, and sends the message body to the device controller in accordance with a communications protocol different from the network plug-and-play protocols, and the device controller interprets the content of the message body received from the network protocol controller, and causes a service device to execute a service according to a result of the interpretation.

4. A network relay device compliant with network plug-and-play protocols for relay between a network and a device unit having N service devices that provide a service in response to a request from a client on the network where N is an integer equal to 1 or greater, the network relay device comprising at least one;

of a description creating module configured to create a device description which describes service devices included in the device unit connected to the network relay device; and a response module configured to respond to a device search request sent from the client in accordance with the network plug-and-play protocols, wherein if one or more service devices among the N service devices belonging to the device unit are inoperative when the description creating module receives a request for a device description sent from the client, the description creating module creates a device description that does not include a description portion of the inoperative service devices and forwards the created device description to the client, wherein the response module responds to a device search request sent from the client if at least one service device in the device unit is in operative condition, while the response module does not respond to a device search request sent from the client if all of the service devices in the device unit are in inoperative condition, and wherein the response module includes:

a device controller for controlling operation the device unit through exchanging information with the device unit; and a network protocol controller, coupled between the network and the device control unit, for receiving from the client over the network a message having a message header and a message body, and forwarding content of the message body to the device control unit;

wherein the network protocol controller interprets the message header in accordance with the network plug-and-play protocols, without interpreting the content of the message body received from the client, and sends the message body to the device controller in accordance with a communications protocol different from the network plug-and-play protocols, the device controller interprets the content of the message body received from the network protocol controller, and causes a service device to execute a service according to a result of the interpretation, the device controller detects whether the service devices belonging to the device unit are operative, and the network protocol controller determines whether to send back a reply to the device search request.

* * * * *